(12) United States Patent
Williams

(10) Patent No.: US 7,537,699 B2
(45) Date of Patent: May 26, 2009

(54) METHODS FOR REDUCING BIOSOLIDS ODORS

(75) Inventor: Todd Owen Williams, Mechanicsville, VA (US)

(73) Assignee: CH2M Hill, Inc., Englewood, CO (US)

( * ) Notice: Subject to any disclaimer, the term of this patent is extended or adjusted under 35 U.S.C. 154(b) by 0 days.

(21) Appl. No.: 11/872,551

(22) Filed: Oct. 15, 2007

(65) Prior Publication Data

US 2008/0290024 A1 Nov. 27, 2008

Related U.S. Application Data

(60) Provisional application No. 60/939,289, filed on May 21, 2007.

(51) Int. Cl.
 *C02F 3/00* (2006.01)
(52) U.S. Cl. ...................................... 210/609; 210/916
(58) Field of Classification Search .................. 210/609, 210/916
 See application file for complete search history.

(56) References Cited

U.S. PATENT DOCUMENTS

| | | | |
|---|---|---|---|
| 3,227,648 A | 1/1966 | Hahn et al. | |
| 3,959,125 A * | 5/1976 | Teletzke | 210/603 |
| 4,108,771 A | 8/1978 | Weiss | |
| 4,246,100 A | 1/1981 | Starr | |
| RE31,924 E | 6/1985 | Starr | |
| 4,541,986 A | 9/1985 | Schwab et al. | |
| 4,781,842 A | 11/1988 | Nicholson | |
| 5,137,687 A | 8/1992 | Dunson, Jr. | |
| 5,141,647 A | 8/1992 | Bhadra | |
| 5,279,637 A | 1/1994 | Lynam et al. | |
| 5,417,861 A | 5/1995 | Burnham | |
| 5,435,923 A | 7/1995 | Girovich | |
| 5,723,048 A | 3/1998 | Kobayashi et al. | |

(Continued)

FOREIGN PATENT DOCUMENTS

WO WO 00/26337 5/2000

(Continued)

OTHER PUBLICATIONS

Chen, et al., "Mechanisms for the Production of Odorous Volatile Aromatic Compounds in Wastewater Biosolids," WEF/WEAU 18th Annual Residuals and Biosolids Conference and Exhibition, 2004, 14 pages, Water Environment Federation.

(Continued)

*Primary Examiner*—Chester T. Barry
(74) *Attorney, Agent, or Firm*—Dorsey & Whitney LLP

(57) ABSTRACT

A method for reducing the odors of an anaerobically digested dewatered biosolids or other biosolids or sludge may include separating first anaerobically digested dewatered biosolids into first and second portions, storing second anaerobically digested dewatered biosolids, removing a portion of the second biosolids, and mixing the removed second biosolids portion with the first portion of the first biosolids. The method may be implemented in a system including a separation device, first, second and third transporters, a storage area, and a mixer. The separation device may separate the first biosolids into first and second portions. The first transporter may transport the first portion to the mixer. The second transporter may transport the second portion to the storage area. The storage area may store the second portion for a select time period. The third transporter may transport a portion of the stored first biosolids to the mixer for blending.

19 Claims, 15 Drawing Sheets

U.S. PATENT DOCUMENTS

| | | | |
|---|---|---|---|
| 5,876,613 A * | 3/1999 | Bonnin et al. | 210/609 |
| 5,984,993 A | 11/1999 | Mainz et al. | |
| 6,281,001 B1 | 8/2001 | McNelly | |
| 6,387,281 B2 | 5/2002 | Millard et al. | |
| 6,908,554 B2 | 6/2005 | Jackson | |
| 7,083,728 B2 | 8/2006 | Logan et al. | |
| 7,285,217 B2 | 10/2007 | Simpson et al. | |
| 2004/0226891 A1 | 11/2004 | Dentel | |
| 2006/0070938 A1* | 4/2006 | McWhirter et al. | 210/202 |
| 2007/0062882 A1 | 3/2007 | Adams et al. | |
| 2008/0073266 A1* | 3/2008 | McWhirter et al. | 210/605 |

OTHER PUBLICATIONS

Chen, et al., "Roles of methanogens on volatile organic sulfur compound production in anaerobically digested wastewater biosolids," Water Science & Technology, 2005, pp. 67-72, vol. No. 1-2, IWA Publishing.

Hamel, et al., "Part I of Field Research: Impact of Centrifuge Torque and Polymer Dose on Dewatering Performance from Anaerobically Digested Biosolids," Joint Residuals and Biosolids Management Conference, 2005, 10 pages, Water Environment Federation.

Higgins, et al., "Effect of Chemical Addition on Production of Volatile Sulfur Compounds and Odor from Anaerobicallly Digested Biosolids," 2002, 14 pages, Water Environment Federation.

Higgins, et al., "Mechanisms of Volatile Sulfur Compound and Odor Production in Digested Biosolids," WEF/AWWA/CWEA Joint Residuals and Biosolids Management Conference and Exhibition 2003, 12 pages, Baltimore, Maryland.

Higgins, et al., "Part II of Field Research: Impact of Centrifuge Torque and Polymer Dose on Odor Production from Anaerobically Digested Biosolids," Joint Residuals and Biosolids Management Conference 2005, 16 pages, Water Environment Federation.

Murthy, et al., "Influence of Solids Characteristics and Dewatering Process on Volatile Sulfur Compound Production from Anaerobically Digested Biosolids," WEF/AWWA/CWEA Joint Residuals and Biosolids Management Conference and Exhibition 2003, 16 pages, Water Environment Federation.

Todd Owen Williams, Method for Reducing Biosolids Odors, U.S. Appl. No. 12/327,526, filed on Dec. 3, 2008, (not yet published).

* cited by examiner

METHODS FOR REDUCING BIOSOLIDS ODORS

CROSS-REFERENCE TO RELATED APPLICATIONS

This application claims the benefit under 35 U.S.C. § 119 (e) to U.S. Provisional Application No. 60/939,289 entitled "Methods and Systems for Reducing Biosolids Odors" and filed on May 21, 2007, the disclosure of which is hereby incorporated by reference herein in its entirety.

FIELD OF INVENTION

The present invention generally relates to biosolids treatment, and more specifically to reducing odors emitted by dewatered biosolids, such as sludge or the like.

BACKGROUND

Many municipal wastewater treatment plants produce biosolids that require utilization or disposal. Prior to utilization or disposal, the biosolids usually require treatment to meet various environmental regulations. For example, the U.S. Environmental Protection Agency often requires stabilizing the biosolids prior to land application or landfill disposal. One common stabilization treatment method involves anaerobically digesting the biosolids. Dewatering of the digested biosolids is commonly practiced for ease of subsequent handling. Although this treatment process usually stabilizes the sludge sufficiently for land application or disposal, the anaerobically digested, dewatered biosolids may emit unpleasant odors for up to two weeks or more. These odors may create a public nuisance if not adequately controlled. An approach for controlling these odors involves adding chemicals, such as metal salts or liming agents, to the biosolids cake. Such an approach, however, has drawbacks, including adding costs to the plant's operation for storing and handling chemicals, and increasing the amount of land required for applying the chemically treated biosolids to account for the chemicals added to the biosolids.

BRIEF SUMMARY

One embodiment of the present invention may take the form of a method for reducing odors emitted by anaerobically digested dewatered biosolids. The method may include dewatering anaerobically digested biosolids to form first anaerobically digested dewatered biosolids, and mixing the first anaerobically digested dewatered biosolids with second anaerobically digested dewatered biosolids. The second anaerobically digested dewatered biosolids may include anaerobically digested dewatered biosolids stored at least approximately three days after dewatering. The second anaerobically digested dewatered biosolids may further include anaerobically digested dewatered biosolids stored between approximately four to fourteen days after dewatering.

Another embodiment of the present invention may take the form of a method for reducing odors emitted by anaerobically digested dewatered biosolids. The method may include separating first anaerobically digested dewatered biosolids into a first portion and a second portion with the second portion including no greater than approximately ten percent of the first anaerobically digested dewatered biosolids, storing second anaerobically digested dewatered biosolids in a first area, removing a portion of the second anaerobically digested dewatered biosolids, and mixing the removed portion of the second anaerobically digested dewatered biosolids with the first portion of the first anaerobically digested dewatered biosolids. The removed portion may include anaerobically digested dewatered biosolids stored for at least a select period of time in the first area after dewatering the removed portion.

Yet another embodiment may take the form of a system for reducing odors emitted by anaerobically digested dewatered biosolids. The system may include a separation device, a first transporter, a second transporter, a storage area, a mixer, and a third transporter. The first transporter may be operatively associated with the separation device. The second transporter may be operatively associated with the separation device. The storage area may be operatively associated with the first transporter. The mixer may be operatively associated with the second transporter. The separation device may separate first anaerobically digested dewatered biosolids into a first portion and a second portion. The first transporter may transport the first portion of the first anaerobically digested dewatered biosolids to the mixer. The second transporter may transport the second portion of the first anaerobically digested dewatered biosolids to the storage area. The storage area may store the second portion of the first anaerobically digested biosolids. The third transporter may transport a portion of stored first anaerobically digested biosolids to the mixer.

DETAILED DESCRIPTION

In a wastewater treatment plant during anaerobic digestion of biosolids or other sludge, a group of microorganisms known as methanogens are formed. These microbes (primarily bacteria) have their metabolism severely slowed and are depleted after the biosolids are removed from an anaerobic digestion vessel and subsequently dewatered by centrifuges, belt filter presses or other dewatering devices. Simultaneously, bacteria, such as sulfur reducing bacteria, grow rapidly using proteins made available by the shearing action of centrifuges, screw conveyors and cake pumps without competition from the slower growing methanogens. Over time, the methanogenic microorganisms begin to re-acclimate in the dewatered biosolids cake during storage and eventually begin degrading odorous sulfur compounds generated by the biosolids cake. At 25° C., odorous compound concentrations in the dewatered biosolids cake dramatically increase in the first 3-10 days of storage followed by a rapid decline of odors to low levels in approximately 7-14 days. Blending biosolids cakes having relatively greater methanogenic or other odor reducing microorganism activity (e.g., biosolids stored approximately 4-30 days) with freshly dewatered biosolids cake may significantly reduce odor production in the dewatered biosolids cake in a much shorter timeframe than the approximately 7-14 days needed without the process, thus minimizing the time required or eliminating the need for storing the freshly dewatered biosolids cake prior to disposal, land application or other materials handling.

Figure 1:
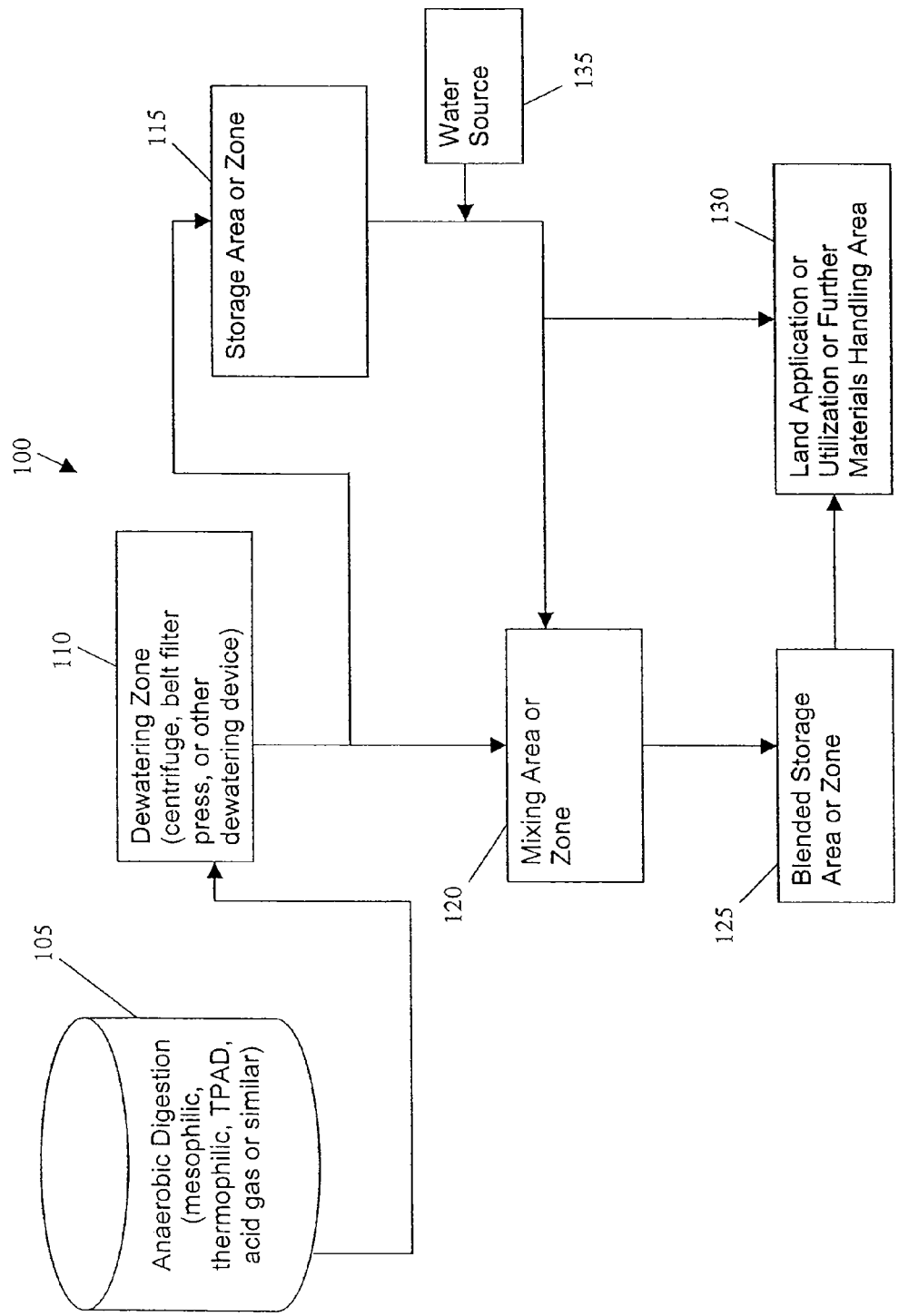
FIG. 1 is a schematic view of a first embodiment of a biosolids treatment system for odor control.

FIG. 1 depicts a schematic view of a first embodiment of a biosolids treatment system 100 for odor control. With reference to FIG. 1, biosolids may be anaerobically digested in an anaerobic digester or suitable device or system 105 for anaerobically digesting biosolids. The anaerobically digested biosolids, or other anaerobically digested sludge, may be dewatered using a dewatering device or system 110, such as a centrifuge or a belt filter press. A first portion of the dewatered biosolids may be transferred to a storage area or zone 115, and a second portion may be transferred to a mixing area or zone 120, which may include a continuous feed mixer (e.g., a pug mill), a batch feed mixer (e.g., a mix box), any other suitable mixer, or any combination thereof. The second portion of biosolids, which are relatively fresh, may be mixed with stored biosolids from the storage area 115 to form blended biosolids, which may be transferred from the mixing zone 120 to a blended storage area or zone 125. The biosolids stored in the storage area may include the first portion of dewatered biosolids and/or biosolids obtained from another biosolids source. From the blended storage area 125, the blended biosolids or other blended sludge may be used for land application, further processed in another area by composting, alkaline stabilization or thermal drying, or otherwise utilized, landfilled, or disposed.

The ratio of the first portion of dewatered biosolids (or other sludges) to the second portion may vary. The first portion may be up to 25 percent or more by weight of the total portion of dewatered biosolids, and the second portion may be the remaining portion of the total dewatered biosolids. The selected percentage for the first biosolids portion may be based on the amount of first portion biosolids required for maintaining a sufficient amount of biosolids stored at least a minimum amount of time for later blending with the second portion to reduce odors as described in more detail below. In some implementations of the process, the first portion may be selected as approximately 10 percent or less to make the process economically competitive with chemical treatment processes for controlling odors produced by anaerobically digested biosolids, or other biosolids or sludges. Above 10 percent, the storage area 115 and/or material handling requirements for the first biosolids portion may significantly increase costs for the process, thus making the odor treatment process potentially less economically viable and/or desirable compared to other alternatives. Diversion of the selected percentage of the first biosolids portion to storage for later use in blending with the second biosolids portion generated each day may be done on a continuous basis, or on a batch basis of once (or a select number of times) per day.

The storage area 115 may take the form of one or more silos, tanks, hoppers, open or closed storage piles, any other suitable storage container or system, or any combination thereof. The storage area 115 may be sized to store at least the average percentage of the average daily dewatered biosolids transferred to the storage area 115 for up to two weeks or more, or for up to at least the time required for methanogens and other microbes to recover from the stress of removal from the digestion process and processing through dewatering. The storage area 115 may be maintained at a temperature, or within a temperature range, to promote, or at least not suppress, growth of the microorganisms in the biosolids or other sludge.

Mesophilic microorganisms within the biosolids or other sludge may tend to thrive within a temperature range between approximately 21 and 41 degrees Celsius, and thermophilic microorganisms within the biosolids or other biosolids may tend to thrive within a temperature range between approximately 52 and 60 degrees Celsius. A transition from temperatures favoring mesophilic microorganisms to those favoring thermophilic microorganisms may occur between approximately 41 and 52 degrees Celsius. Below 0 degrees Celsius and above 60 degrees Celsius, microorganism activity may undesirably decrease and/or be suppressed. Accordingly, the temperature in the storage area 115 may be maintained at some temperature, or temperature range, between approximately 0 and 60 degrees Celsius to promote, or at least not suppress, microorganism growth in the biosolids or other sludge. Further, the maintained temperature, or temperature range, may be selected based on the desired microorganism population and/or growth rate in the biosolids or other sludge. For example, the temperature range may be selected to be between approximately 10 and 40 degrees Celsius to promote, or at least not suppress, mesophilic microorganisms. The foregoing example is merely illustrative and is not intended to limit the use of other temperatures or temperature ranges.

The stored biosolids may be stored in the storage area 115 at least a sufficient time for the microorganisms to recover from the dewatering process. Biological activity may return to previous levels, or otherwise increase, within approximately four to fourteen days after dewatering the anaerobically digested biosolids. Accordingly, the stored biosolids may be stored approximately four to fourteen days prior to removal from the storage area 115 for blending with the second portion of the anaerobically dewatered biosolids. However, depending upon the biosolids or biosolids characteristics and the ambient temperature for storing the biosolids, the time for recovery may be greater or less than approximately four to fourteen days, and thus the stored biosolids may be stored for greater or less than approximately four to fourteen days. For example, biosolids may be stored for as short as three days or as long as thirty days or more. Field or laboratory testing may be performed on the biosolids to determine the time generally required for the methanogens and other odor reducing microorganisms' biological activity to return to a robust level. To facilitate efficient use of storage space and/or to deliver biosolids with desired biological activity level, the stored biosolids removed for mixing with the second portion of the dewatered biosolids may be the biosolids stored the longest time in the storage area (i.e., first in, first out).

The mixing area 120 may include continuous feed mixers (such as pug mills), batch feed mixers (such as mix boxes, front-end loaders, windrow turners, and so on), or a combination of continuous and batch feed mixers. Thorough mixing of the stored biosolids with the second biosolids portion may enhance regrowth of odor reducing microbes throughout the quantity of the second biosolids portion. Mixing the stored biosolids with the second biosolids portion seeds the second portion with biosolids that may contain a greater concentration of odor reducing microbial organisms with a greater biological activity rate than the second biosolids portion. Such seeding may reduce the time required for noxious or offensive odors to be reduced to acceptable levels in the blended biosolids portion, thus allowing the wastewater treatment plant to more quickly move the blended biosolids from the plant to an utilization or other site 130 away from the plant compared to unblended biosolids. Further, such time reductions may occur without the addition of chemicals or other additives to control odors emitted by the dewatered biosolids. However, chemicals or additives for further reducing the storage time or for other purposes may be added, if desired. Additionally, water or other liquids may be added to facilitate mixing the stored biosolids with the second biosolids portion.

The ratio by weight of the second biosolids portion to the stored biosolids that results in a reduction in the time for odor reduction in the second biosolids portion may vary depending upon the characteristics of the biosolids (or other sludge), the ambient temperature, and other factors. For some biosolids or other sludge, the ratio may be approximately 3 to 1 or less, with some biosolids or other sludge approaching ratios of 9 to 1 or less. One potential range for the ratio may be between approximately 99 to 1 and 9 to 1. Field or laboratory testing may be performed on the biosolids or other sludge on a case by case basis to determine the required minimum and/or the optimal ratio of the second biosolids portion to the stored biosolids to result in a time reduction for odorous emissions from the second biosolids portion.

A portion of the biosolids removed from the storage area 115 may be land applied or transferred to a utilization or disposal site 130 rather than blended with the second portion of the dewatered biosolids. Such removal may be used to maintain storage capacity in the storage area 115 when less than the total quantity of biosolids removed from the storage area 115 is desired for blending with the second portion of the anaerobic dewatered biosolids.

Similar to the storage area 115, the blended storage area 125 may take the form of any suitable storage container or system, including silos, tanks, hoppers, storage piles, and so on. The blended storage area 125 may be sized to store the average daily biosolids, or dewatered anaerobically digested biosolids, produced for a predetermined number of days. The predetermined number of days may be approximately seven days or less. Biosolids removed from the blended storage area 125 may be removed in a first in, first out process similar to the removal of stored biosolids from the storage area 115. Depending upon the odor characteristics of the blended biosolids or other factors, the blended storage area 125 may be eliminated, and the blended biosolids may be directly moved to a utilization site 130 or processed for further handling.

Biosolids may be moved between the various zones, areas, or equipment by any suitable transporter, system or device for moving solid or partially solid materials, including conveyors (e.g., screw or belt conveyors), high solids pumps and piping, front end loaders, and so on. For example, stored biosolids may be transferred to the mixing area 120 using a screw conveyor. As another example, stored biosolids may be transferred to the mixing area 120 through piping joining the storage area 115 with the mixing area 120 using a high solids pump, such as a progressive cavity pump or a hydraulic cylinder pump, to move the biosolids through the piping at a metered rate. Yet further, the feed rate of the transporter between the storage area 115 and the mixing area 120 may be feed paced to the feed rate of the transporter between the dewatering zone 110 and the mixing area 120, or vice versa. To facilitate transportation of the stored biosolids, or mixing of the stored biosolids with the fresh biosolids, water from a water source 135 may be added to the biosolids removed from the storage area 115. The quantity of added water may be sufficient to form a slurry. The water source 135 may be any suitable water source, including wastewater treated in the wastewater treatment facility.

Figure 2:
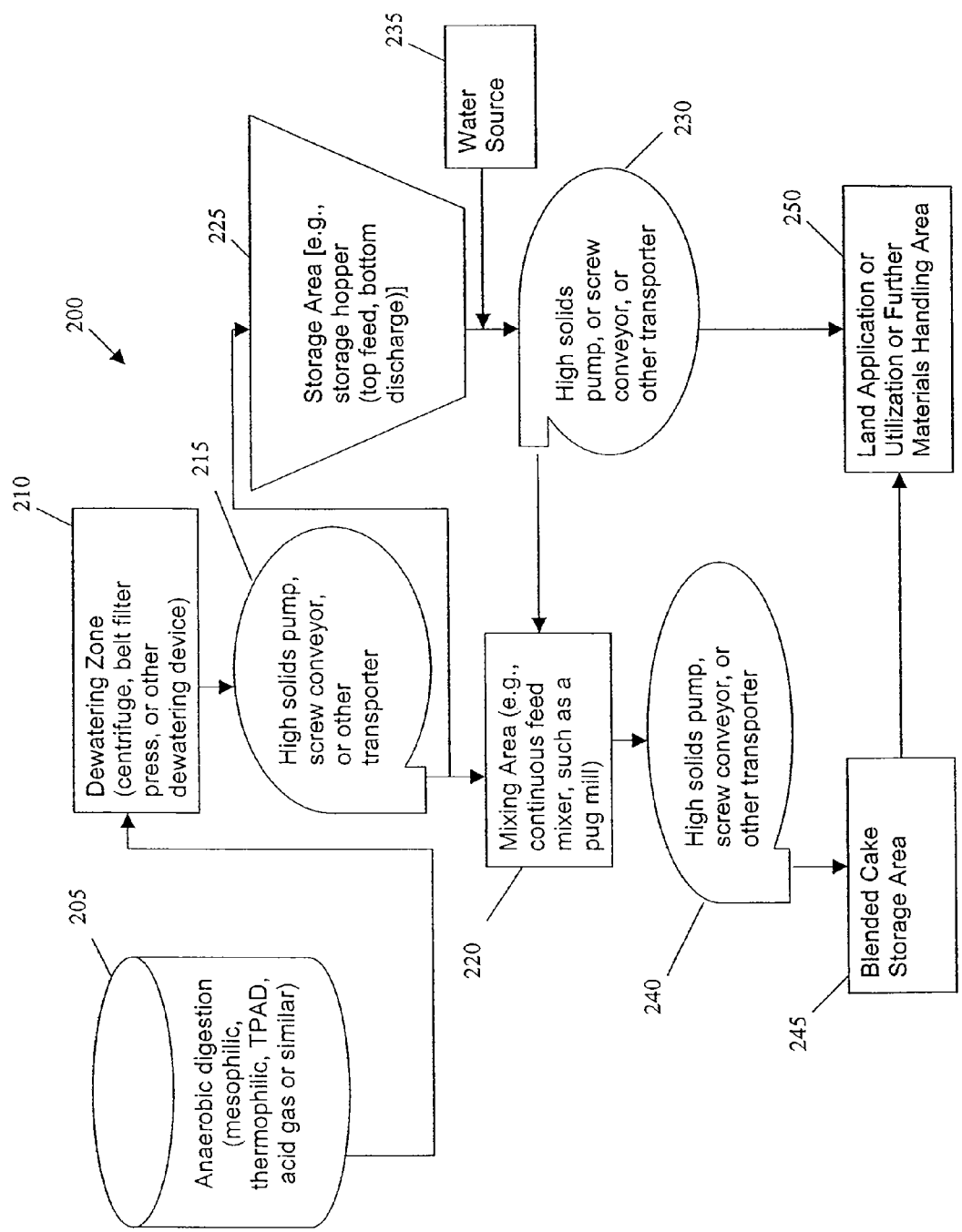
FIG. 2 is a schematic view of a second embodiment of a biosolids treatment system for odor control.

FIG. 2 depicts a schematic view of a second embodiment of a biosolids treatment system 200 for odor control. The second embodiment is similar to the first embodiment except the system is shown as a mechanized, continuous system for moving the biosolids between the various treatment and mixing zones and for mixing the dewatered biosolids with the stored biosolids to create blended biosolids. With reference to FIG. 2, a portion of the anaerobic dewatered biosolids obtained from an anaerobic digester 205 (or other suitable anaerobic digestion system) and a dewatering device 210 may be moved using a continuous transporter 215, such as a screw conveyor or a high solids pump, from the dewatering device 210 to a continuous feed mixer 220 and another portion to a storage area 225 using the same or similar type of continuous transporter 215. The storage area 225 may be a top feed, bottom discharge silo or hopper. A top feed, bottom discharge silo or hopper 225 provides an efficient system for removing biosolids in a first in, first out process, thus making it easier to remove the longest stored biosolids from the storage area 225.

A second high solids pump, screw conveyor or other continuous transporter 230 may transfer stored biosolids from the storage silo or hopper 225 to the continuous feed mixer 220 for forming a blended biosolids. Similar to the previously described embodiment, water may be added from a water source 235 to facilitate transportation of the stored biosolids, or mixing of the stored biosolids with the relatively fresh biosolids in the mixing area or zone 220. A third high solids pump, screw conveyor or other continuous transporter 240 may move the blended biosolids from the continuous feed mixer 220 to a blended cake storage area 245. In some processes, the blended storage area 245 may be omitted and the blended biosolids may be transported to an area 250 for relatively immediate land application, utilization, or other materials handling or disposal.

Figure 3:
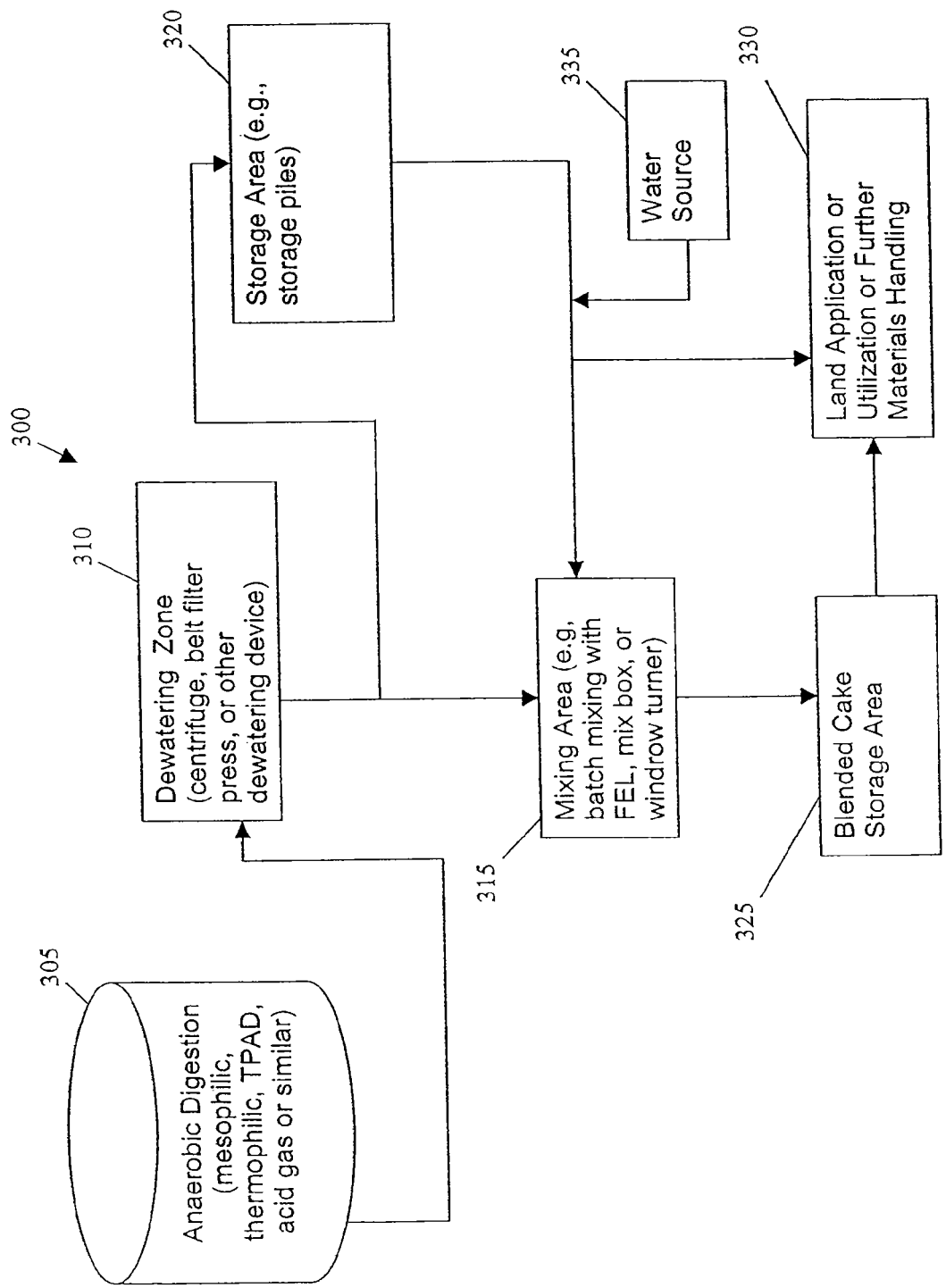
FIG. 3 is a schematic view of a third embodiment of a biosolids treatment system for odor control.

FIG. 3 depicts a schematic view of a third embodiment of a biosolids treatment system 300 for odor control. The third embodiment is similar to the first embodiment except the system 300 is shown as a batch system for moving the biosolids between the various treatment and mixing zones and for mixing the dewatered biosolids with the stored biosolids to create a blended biosolids. With reference to FIG. 3, a portion of the dewatered anaerobic biosolids obtained from an anaerobic digester 305 (or other suitable anaerobic digestion system) and a dewatering device 310 may be moved using a batch transporter, such as a front end loader (FEL) or other batch mover, from the dewatering device 310 to a mixing area 315 and another portion moved to a storage area 320 using the same or another batch transporter. The storage area 320 may be covered storage piles deposited in the area using a front end loader. A front end loader or other batch transporter may also be used to move the stored biosolids from the storage piles to the mixing area 315 for mixing the dewatered biosolids with the stored biosolids in a mix box, open pad or other suitable batch mixer. The blended biosolids may be moved from the mixing area 315 to a blended storage area 325 using a front end loader or other batch transporter. In some processes, the blended storage area 325 may be omitted and the blended biosolids may be moved to an area 330 for relatively immediate land application, utilization, or other materials handling or disposal. Like the previously described embodiments, water may be added from a water source 335 to facilitate transportation of the stored biosolids, or mixing of the stored biosolids with the relatively fresh biosolids in the mixing area 315.

Although the methods and systems above are described with respect to anaerobically digested biosolids or other sludge, the systems may also be used with aerobically digested biosolids or other sludge, or a combination of anaerobically and aerobically digested biosolids or other sludge.

Bench scale testing of blending stored dewatered biosolids with freshly dewatered sludge was conducted in three phases (Phase I, Phase II and Phase III) to determine the effectiveness of mixing stored anaerobically digested dewatered biosolids with fresh anaerobically digested dewatered biosolids to reduce the time required for odor reduction in the fresh anaerobically digested dewatered biosolids. The testing protocol and results for Phases I, II and III are summarized below. The bench scale testing demonstrated that blending fresh and stored anaerobically digested dewatered biosolids can reduce the time required for odor reduction in anaerobically digested dewatered biosolids compared to just storing the anaerobically digested dewatered biosolids.

Phase I Bench Scale Testing

Two weeks before sample testing, a pile of biosolids cake fresh off a wastewater plant's high-solids centrifuge was placed into storage. Two weeks later, additional biosolids cake was obtained from the wastewater plant for testing purposes. Parameters from the plant's SCADA system and from field testing were recorded to assess the character of these collected biosolids cakes.

Four buckets were used for the testing. Each bucket was filled with a known quantity of biosolids cake on Day 0. Additionally, each bucket was fitted with a sealed cover having an orifice snugly fit with a thermometer and Drager tube suitable for testing. The orifice in each bucket was plugged with duct tape between testing events to simulate bottle sampling done in WERF (Water Environment Research Foundation) odor studies.

Biosolids cake was added to the buckets on Day 0 as follows. Bucket 1 was loaded with biosolids cake fresh off the high-solids centrifuge, and the lid was tightly fitted onto it. Bucket 2 was loaded with stored, 2-week old biosolids cake from the pile collected two weeks prior to Day 0 and then closed off with the fitted lid. Bucket 3 was loaded with a uniformly mixed blend of 90% fresh biosolids cake and 10% of the 2-week old biosolids cake by weight. Bucket 3 was then closed securely with a fitted lid. Finally, Bucket 4 was loaded with a uniformly mixed blend of 95% fresh biosolids cake and 5% of the 2-week old biosolids cake by weight. Bucket 4 was subsequently closed with a fitted lid. The buckets with mixed cake were blended by plunging a small rake-like utensil into the cake mixture repeatedly until the mixture appeared to be uniform. The buckets were labeled and stored in a secure place with exposure to ambient (but shaded) temperatures On testing Days 1, 3, 4, 7, 10, and 14, the Drager tubes were used to measure concentrations of headspace odorants in parts per million by volume (ppmv), including dimethyl sulfide (DMS), hydrogen sulfide ($H_2S$), and mercaptan. Additionally, the temperature of the biosolids cake in each bucket was measured on Days 4 through 14. Concentrations of each odorant were recorded on each testing day. Additionally, 2-week odor profiles were developed for the contents of each bucket to more clearly identify trends in concentrations of headspace odorants over time.

Table 1 presents the parameters for biosolids cakes collected from the wastewater plant. These parameters were obtained using the wastewater plant's SCADA system as well as by conducting field tests on representative portions of each biosolids cake. The parameters shown in Table 1 were quantitatively consistent for both piles of biosolids cake collected, with small variations in pH and unknown differences in initial pile temperature. At the time of collection of the fresh pile of biosolids cake on Day 0, ferric chloride was being fed to the dewatering building at the rate of 1.2 gallons per minute.

TABLE 1

BIOSOLIDS CAKE CHARACTER PARAMETERS

| Date of Production | Description | Temperature at Production Time (° F.) | Polymer Feed Rate (gpm) | Feed Biosolids Conc. (% solids) | Feed Biosolids Rate (gpm) | Cake Concentration (% solids) | Pile pH two weeks prior to Day 0 | Day 0 Pile pH |
|---|---|---|---|---|---|---|---|---|
| Two weeks prior to Day 0 | 2-week Old Cake | Unknown | 40 | 2.34 | 400 | 21.69 | 7.38 | 8.16 |
| Day 0 | Fresh Cake | 95 | 40 | 2.3 | 400 | 21 | — | 7.48 |

Figure 4:
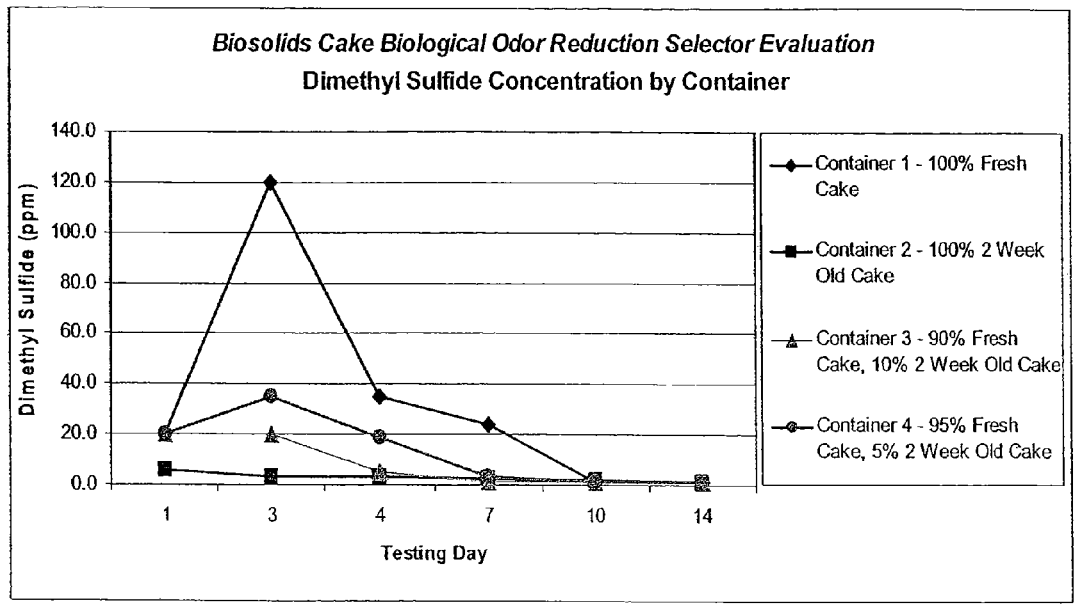
FIG. 4 is a graph of dimethyl sulfide concentration by sample container from gas detection tube analysis conducted in Phase I testing.

The results for dimethyl sulfide (DMS) testing are presented for each testing day by sample container in Table 2. FIG. 4 graphically demonstrates the results for dimethyl sulfide (DMS) testing by testing day and by sample container. DMS concentrations in buckets containing fresh and blended cake were virtually the same on Day 1 of testing at 20 ppm, but DMS concentrations in buckets containing blended cake remained significantly lower throughout the rest of the study, as shown in Table 2 and FIG. 4. DMS readings in the bucket containing only the 2-week old cake (i.e., bucket 2) stayed the lowest throughout the study period, remaining below 6 ppm over the duration of the study.

TABLE 2

DIMETHYL SULFIDE CONCENTRATIONS BY SAMPLE CONTAINER

| Container Tested | Day 1 | Day 3 | Day 4 | Day 7 | Day 10 | Day 14 |
|---|---|---|---|---|---|---|
| 1 - 100% Fresh Cake | 20.0 | 120.0 | 35.0 | 24.0 | 1.0 | 1.0 |
| 2 - 100% 2 Week Old Cake | 6.0 | 3.0 | 3.0 | 2.5 | 2.0 | 1.5 |
| 3 - 90% Fresh Cake, 10% 2 Week Old Cake | 20.0 | 20.0 | 5.5 | 1.5 | 1.0 | 1.0 |
| 4 - 95% Fresh Cake, 5% 2 Week Old Cake | 20.0 | 35.0 | 19.0 | 3.0 | 1.0 | 1.0 |

Figure 5:
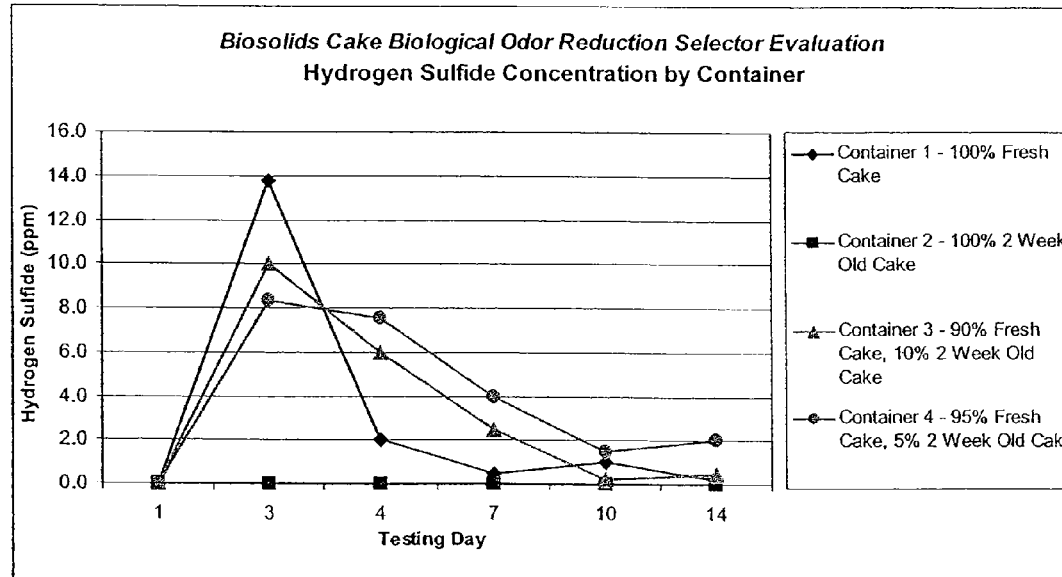
FIG. 5 is a graph of hydrogen sulfide concentration by sample container from gas detection tube analysis conducted in Phase I testing

The results for hydrogen sulfide ($H_2S$) testing are presented for each testing day by sample container in Table 3. FIG. 5 illustrates results for hydrogen sulfide ($H_2S$) testing by testing day and by sample container. Hydrogen sulfide concentrations were the same in all buckets on Day 1 of testing at 0 ppm. On Day 3, levels of hydrogen sulfide in buckets containing fresh and blended cake peaked, with buckets containing blended cake peaking well below the level of hydrogen sulfide measured in the bucket containing all fresh cake. However, hydrogen sulfide levels in buckets with blended cake exceeded levels in the bucket containing fresh cake over the remainder of the study period, with the exception of Day 10 odorant levels, when hydrogen sulfide levels in the bucket containing 10% 2-week old cake dropped below the hydrogen sulfide levels measured in the bucket containing all fresh cake.

TABLE 3

HYDROGEN SULFIDE CONCENTRATIONS BY SAMPLE CONTAINER

| Container Tested | Day 1 | Day 3 | Day 4 | Day 7 | Day 10 | Day 14 |
|---|---|---|---|---|---|---|
| 1 - 100% Fresh Cake | 0.0 | 13.8 | 2.0 | 0.5 | 1.0 | 0.2 |
| 2 - 100% 2 Week Old Cake | 0.0 | 0.0 | 0.0 | 0.0 | 0.0 | 0.0 |
| 3 - 90% Fresh Cake, 10% 2 Week Old Cake | 0.0 | 10.0 | 6.0 | 2.5 | 0.2 | 0.5 |
| 4 - 95% Fresh Cake, 5% 2 Week Old Cake | 0.0 | 8.3 | 7.5 | 4.0 | 1.5 | 2.0 |

Figure 6:
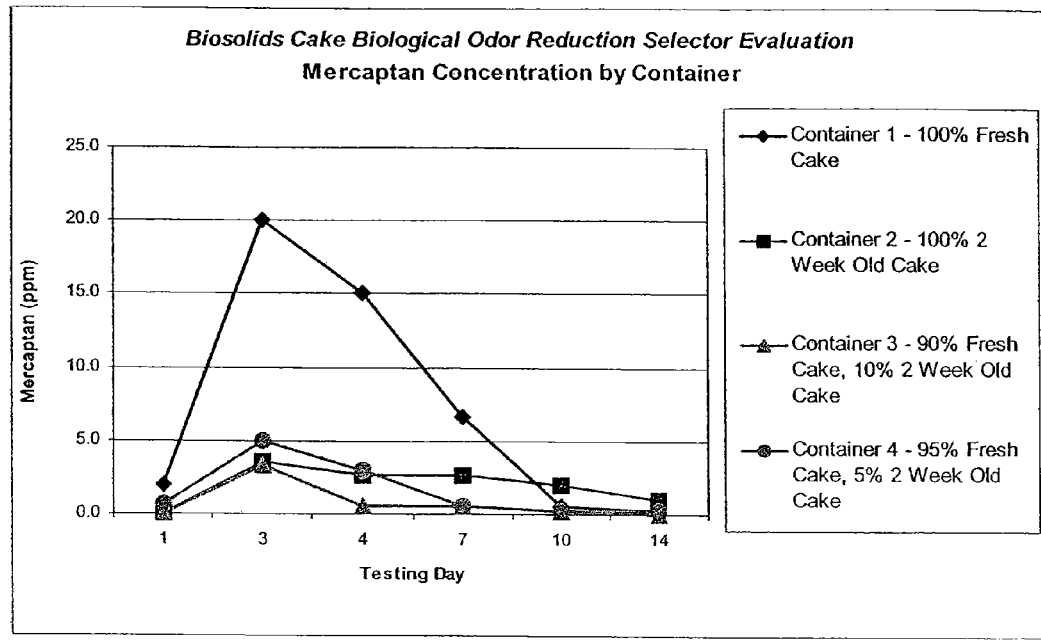
FIG. 6 is a graph of mercaptan concentration by sample container from gas detection tube analysis conducted in Phase I testing.

Table 4 presents the data for mercaptan concentration by sample container over the 2-week testing period. FIG. 6 presents the mercaptan concentrations by testing day and by sampling container. Mercaptan levels were higher in the bucket containing all fresh cake over most of the study period, with mercaptan levels in the bucket containing all 2-week old cake surpassing the levels in the bucket with fresh cake on Days 10 and 14. Mercaptan concentrations in all buckets peaked on Day 3, with buckets with 2-week old and blended cake peaking at levels well below the mercaptan level measured in the bucket containing fresh cake.

TABLE 4

MERCAPTAN CONCENTRATIONS BY SAMPLE CONTAINER

| Container Tested | Day 1 | Day 3 | Day 4 | Day 7 | Day 10 | Day 14 |
|---|---|---|---|---|---|---|
| 1 - 100% Fresh Cake | 2.0 | 20.0 | 15.0 | 6.7 | 0.5 | 0.3 |
| 2 - 100% 2 Week Old Cake | 0.0 | 3.5 | 2.7 | 2.7 | 2.0 | 1.0 |
| 3 - 90% Fresh Cake, 10% 2 Week Old Cake | 0.0 | 3.3 | 0.5 | 0.5 | 0.3 | 0.0 |
| 4 - 95% Fresh Cake, 5% 2 Week Old Cake | 0.7 | 5.0 | 3.0 | 0.5 | 0.3 | 0.3 |

Figure 7:
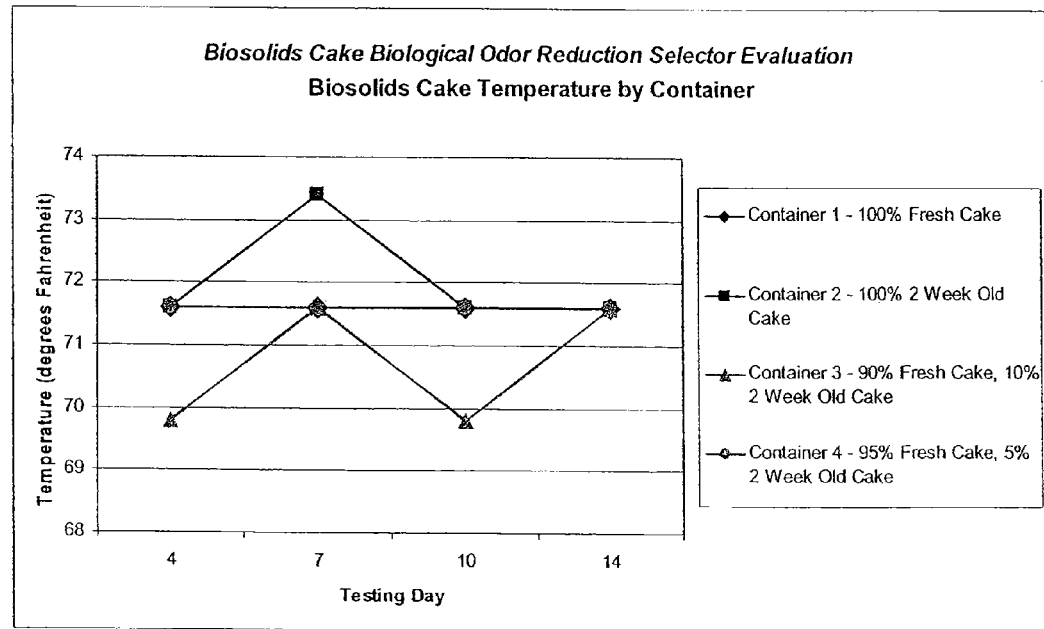
FIG. 7 is a graph of biosolids cake temperature by sample container from field analysis conducted in Phase I testing.

FIG. 7 presents the temperatures in each bucket from testing Day 4 to testing Day 14. Temperatures remained consistent in each bucket and over time among all of the buckets.

In sum, the headspace odorant levels in buckets containing all fresh cake and buckets containing blended cake peaked on testing Day 3. DMS levels in the bucket containing 2-week old cake declined steadily over the testing period, and $H_2S$ levels in the same bucket remained at 0 ppm throughout the study period. However, mercaptan levels peaked in the bucket containing all 2-week old cake on Day 3, as did mercaptan levels in all other buckets.

Phase II Bench Scale Testing

Two weeks before sample testing, a pile of biosolids cake fresh off a wastewater plant's high-solids centrifuge was placed into storage. Two weeks later, additional biosolids cake was obtained from the wastewater plant for testing purposes. The parameters from the plant's SCADA system and from field testing were recorded to assess the character of these collected biosolids cakes.

Twelve containers, each filled with a known weight of the biosolids cake, were used and designated as either an A or a B container. Each container was filled with a known quantity of biosolids cake on Day 0. Each "A" designated container was fitted with a sealed cover having an orifice snugly fit with a Drager tube suitable for testing. Each container's orifice was plugged with packaging tape between testing events to simulate bottle sampling done in previous WERF odor studies. Fitted lids were also placed on "B" designated containers.

Biosolids cake was added to the containers on Day 0 as follows. Approximately 30 lbs of fresh biosolids cake were added to each of the 100%-Fresh containers (A and B). Approximately 30 lbs of 2-week old biosolids cake were added to each of the 100%-Stored containers (A and B). The remaining containers were filled by adding 10 lbs (one third of the total fresh biosolids cake allotted to each container) to each of the following containers: 90:10 (A and B), 95:5 (A and B), 97.5:2.5 (A and B), and 97.5:2.5liq (A and B). Container labels using percentages (90:10, etc.) refer to the percentages of fresh biosolids cake and stored biosolids cake, respectively, by wet weight in each container. Then, one third of the stored cake allotted to each container was placed into each container. Following that, 10 lbs of fresh biosolids cake were again added, followed by the addition of another one third of the stored cake allotted to each container. The final 10 lbs of fresh biosolids cake were placed into each container, and then the final one third of the stored biosolids cake allotted to each container was placed into each container. See Table 5, below, for the approximate weights of both fresh and stored biosolids cake placed into each container.

TABLE 5

WEIGHTS OF BIOSOLIDS BY CONTAINER AND BY TYPE

| Container ID | Fresh Cake (lb) | Stored Cake (lb) | Water (lb) | Total Weight (lb) |
|---|---|---|---|---|
| Bucket 1a, 1b (100% Fresh) | 30.0 | 0.0 | — | 30.0 |
| Bucket 2a, 2b (100% Stored) | 0.0 | 30.0 | — | 30.0 |
| Bucket 3a, 3b (90% Fresh, 10% Stored) | 30.0 | 3.0 | — | 33.0 |
| Bucket 4a, 4b (95% Fresh, 5% Stored) | 30.0 | 1.5 | — | 31.5 |
| Bucket 5a, 5b (97.5% Fresh, 2.5% Stored) | 30.0 | 0.8 | — | 30.8 |
| Bucket 6a, 6b (97.5% Fresh, 2.5% Stored-Mixed with Liquid) | 30.0 | 0.8 | 2.3 | 33.0 |

The contents of all containers were blended by plunging and rotating a clawed soil blending tool into the cake mixture repeatedly until the mixture appeared to be uniform. The mixing tool was cleaned before mixing the contents of each successive container to avoid any cross-contamination among the different containers.

On Day 0, biosolids cake samples of approximately 0.5 gallons (each) by volume were obtained from all "A" designated containers for TVOSC analysis. TVOSC analysis was performed on Days 2, 3, 4, 7, and 8. The bags were labeled with a coded lettering system to ensure that TVOSC testing was not biased due to knowledge of the origin and composition of each sample.

On testing Days 1, 3, 4, 7, and 10, the Drager tubes (gas detection tubes) were used to measure concentrations of headspace odorants in ppmv in "A" designated containers, including dimethyl sulfide (DMS), hydrogen sulfide ($H_2S$), and mercaptan. Volatile organic sulfur compounds, such as DMS, are often the main odor compounds associated with biosolids, such as sludge. Temperatures of biosolids cake were measured in all "B" designated containers on testing Days 1, 3, 4, 7, and 10. Concentrations of headspace odorants in each "A" designated container were recorded on each testing day. Additionally, odor profiles were developed for the contents of each "A" designated container.

Table 6 presents parameters for the fresh and stored biosolids cakes, which were measured on the days each biosolids cake was collected. Information in Table 6 was obtained using the wastewater plant's SCADA system and from field testing representative portions of each biosolids cake. No percent solids tests were run on high-solids biosolids product on the day of stored cake collection since the low-solids centrifuges were the primarily used on that collection day. Additionally, different high-solids centrifuges were used on the day of stored cake collection and the day of fresh cake collection due to equipment reliability issues.

TABLE 6

BIOSOLIDS CAKE CHARACTER PARAMETERS

| Description | Temp. at Production Time (° F.) | Polymer Feed Rate (gpm) | Feed Biosolids Conc. (% solids) | Feed Biosolids Rate (gpm) | Cake Conc. (% solids) | Day 0 minus 2 weeks Pile pH | Day 0 Pile pH |
|---|---|---|---|---|---|---|---|
| 2-week Old Cake | 93.2 | 37 | 2.75 | 400 | Unknown | 6.96 | 8.3 |
| Fresh Cake | 100.4 | 29 | 3.26 | 335 | 26.48 | — | 7 |

The field (gas detection tube) results for dimethyl sulfide (DMS) testing are presented for each testing day, by sample container, in Table 7. From testing Day 4 onward, field DMS levels in the 100%-Fresh container exceeded those in all other containers.

TABLE 7

DIMETHYL SULFIDE CONCENTRATIONS BY SAMPLE CONTAINER (GAS DETECTION TUBE ANALYSIS)[1]

| Container Tested | Day 1 | Day 3 | Day 4 | Day 7 | Day 10 |
|---|---|---|---|---|---|
| 100%-Fresh | 16.0 | 40.0 | 50.0 | 60.0 | 2.5 |
| 100%-Stored | 3.0 | 3.0 | 2.0 | 6.7 | 1.0 |
| 90:10 | 26.0 | 17.5 | 14.0 | 3.3 | 1.0 |
| 95:5 | 32.5 | 37.5 | 26.0 | 20.0 | 1.5 |
| 97.5:2.5 | 10.0 | 40.0 | 33.3 | 6.7 | 1.0 |
| 7.5:2.5 liq | 42.9 | 80.0 | 37.5 | 5.7 | 1.0 |

[1] All concentrations are presented in ppm

Table 8 demonstrates DMS laboratory results for samples split from "A" designated containers.

TABLE 8

DIMETHYL SULFIDE CONCENTRATIONS BY SAMPLE (LABORATORY ANALYSIS)[1]

| Container Tested | Day 2 | Day 3 | Day 4 | Day 7 | Day 8 |
|---|---|---|---|---|---|
| 100%-Fresh | 57.0 | 79.0 | 104.0 | 134.0 | 1.0 |
| 100%-Stored | 9.0 | 2.0 | 0.0 | 0.0 | 0.0 |
| 90:10 | 26.0 | 5.0 | 2.0 | 0.0 | 0.0 |
| 95:5 | 99.0 | 89.0 | 5.0 | 0.0 | 0.0 |
| 97.5:2.5 | 37.0 | 107.0 | 25.0 | 0.0 | 0.0 |
| 97.5:2.5 liq | 90.0 | 100.0 | 105.0 | 0.0 | 0.0 |

[1] All concentrations are in mg/m$^3$

Figure 8:
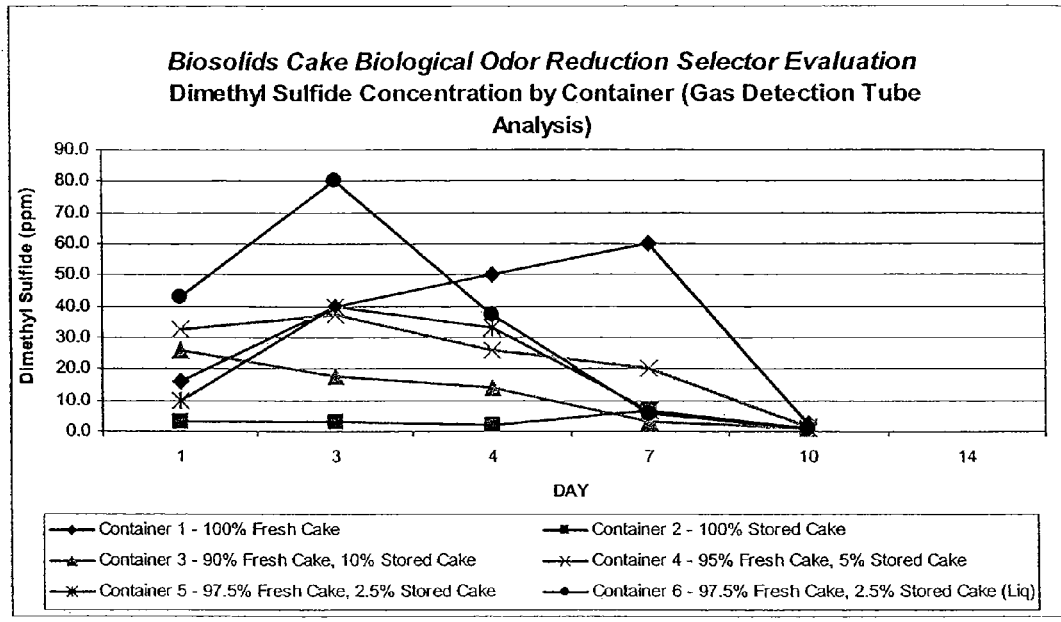
FIG. 8 is a graph of dimethyl sulfide concentration by sample container from gas detection tube analysis conducted in Phase II testing.
Figure 9:
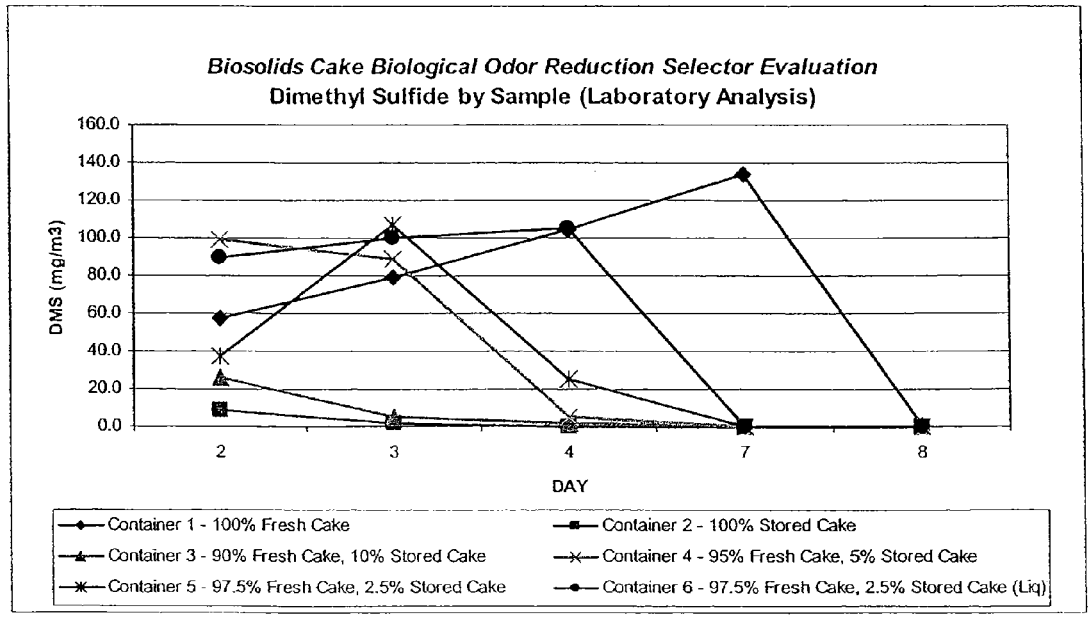
FIG. 9 is a graph of dimethyl sulfide concentration by sample from laboratory analysis conducted in Phase II testing.

FIG. 8 graphically demonstrates the results (ppm) from field (gas detection tube) testing for DMS by testing day and sample container, and FIG. 9 graphically illustrates the laboratory results (mg/m$^3$) for DMS concentration by testing day and sample container.

Table 9 presents the percent reduction data for dimethyl sulfide by sample container. Values for percent reduction were obtained by calculating the areas under the laboratory analysis curves for each sample container (in mg/m$^3$*day). Then, the percent reduction values were obtained by comparing the area under the curve for the given sample container to the area under the curve for the 100%-Fresh sample container. Negative values indicate a higher overall odorant concentration (over time) than measured in the 100%-Fresh container prior to that testing day.

The field (gas detection tube) analysis results for hydrogen sulfide (H$_2$S) testing are presented for each testing day by sample container in Table 10. As with Phase I hydrogen sulfide testing, results for field hydrogen sulfide concentrations displayed erratic behavior over the testing duration. Although, overall concentrations for hydrogen sulfide dropped over the course of testing, sufficient data is not available for simplifying and relating trends in hydrogen sulfide concentration based on container contents.

TABLE 10

HYDROGEN SULFIDE CONCENTRATIONS BY SAMPLE CONTAINER (GAS DETECTION TUBE ANALYSIS)[1]

| Container Tested | Day 1 | Day 3 | Day 4 | Day 7 | Day 10 |
|---|---|---|---|---|---|
| 100%-Fresh | 5.0 | 4.5 | 3.8 | 3.3 | 0.5 |
| 100%-Stored | 0.4 | 1.5 | 0.0 | 2.5 | 0.2 |
| 90:10 | 4.0 | 4.0 | 0.5 | 3.3 | 0.5 |
| 95:5 | 8.3 | 4.5 | 2.0 | 3.0 | 0.5 |
| 97.5:2.5 | 0.0 | 0.5 | 1.0 | 2.0 | 0.0 |
| 97.5:2.5 liq | 6.0 | 2.0 | 0.5 | 2.8 | 0.0 |

[1] All concentrations are presented in ppm

Table 11 presents the hydrogen sulfide laboratory analysis results for samples obtained from "A" designated containers.

TABLE 11

HYDROGEN SULFIDE CONCENTRATIONS BY SAMPLE (LABORATORY ANALYSIS)[1]

| Container Tested | Day 2 | Day 3 | Day 4 | Day 7 | Day 8 |
|---|---|---|---|---|---|
| 100%-Fresh | 0.0 | 0.6 | 0.7 | 1.0 | 0.4 |
| 100%-Stored | 0.7 | 0.7 | 0.5 | 0.5 | 0.0 |
| 90:10 | 0.0 | 1.4 | 0.5 | 1.4 | 0.0 |
| 95:5 | 0.0 | 0.3 | 0.6 | 1.1 | 0.0 |
| 97.5:2.5 | 0.4 | 1.0 | 0.9 | 0.5 | 0.0 |
| 97.5:2.5 liq | 0.6 | 0.6 | 0.6 | 1.4 | 0.0 |

[1] All concentrations are in mg/m$^3$

Figure 10:
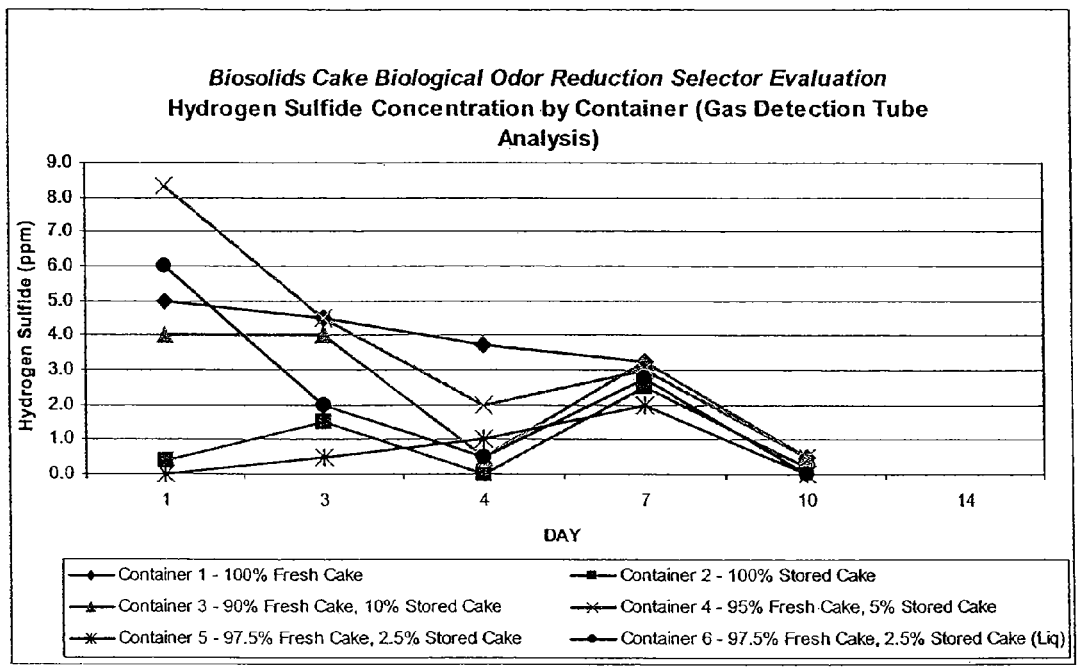
FIG. 10 is a graph of hydrogen sulfide concentration by sample container from gas detection tube analysis conducted in Phase II testing.
Figure 11:
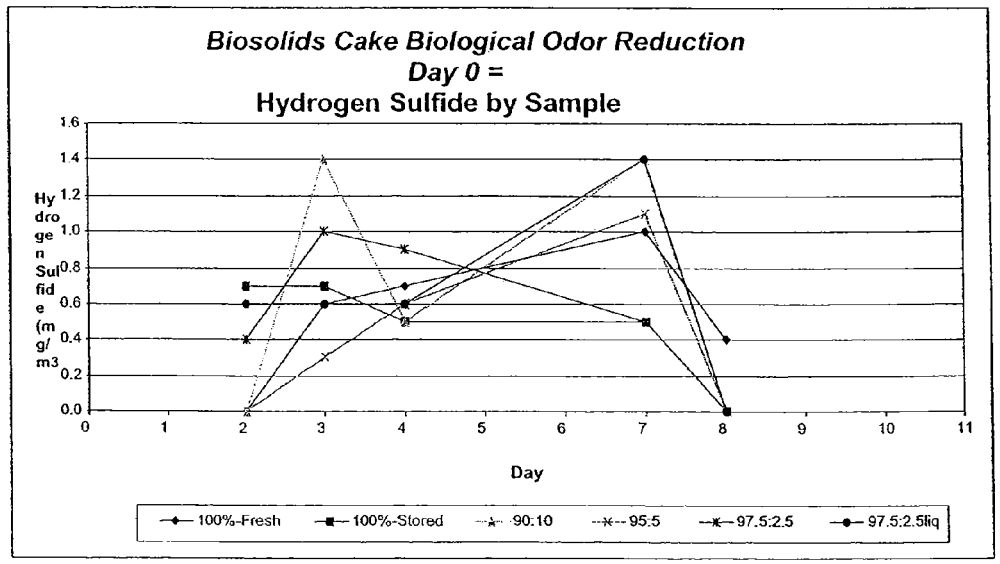
FIG. 11 is a graph of hydrogen sulfide concentration by sample from laboratory analysis conducted in Phase II testing.

FIG. 10 illustrates the field (gas detection tube) results (ppm) for hydrogen sulfide (H$_2$S) testing by testing day and by sample container, further showing the inconsistent nature of the Phase II results for hydrogen sulfide field testing. FIG. 11 graphically presents the hydrogen sulfide results (by sample) from laboratory testing.

Table 12 presents data from field (gas detection tube) testing for mercaptan concentration by sample container.

TABLE 9

PERCENT REDUCTION DATA FOR DIMETHYL SULFIDE (LABORATORY ANALYSIS)

| Container ID | Day 3 Cumulative Area (mg/m$^3$ * day) | Day 3 Reduction (%) | Day 4 Cumulative Area (mg/m$^3$ * day) | Day 4 Reduction (%) | Day 7 Cumulative Area (mg/m$^3$ * day) | Day 7 Reduction (%) |
|---|---|---|---|---|---|---|
| 100%-Fresh | 68 | — | 159.5 | — | 516.5 | — |
| 90:10 | 15.5 | 77.2 | 19 | 88.1 | 22 | 95.7 |
| 95:5 | 94 | −38.2 | 141 | 11.6 | 148.5 | 71.2 |
| 97.5:2.5 | 72 | −5.9 | 138 | 13.5 | 175.5 | 66.0 |
| 97.5:2.5 liq | 95 | −39.7 | 197.5 | −23.8 | 355 | 31.3 |

TABLE 12

MERCAPTAN CONCENTRATIONS BY SAMPLE (GAS DETECTION TUBE ANALYSIS)[1]

| Container Tested | Day 1 | Day 3 | Day 4 | Day 7 | Day 10 |
|---|---|---|---|---|---|
| 100%-Fresh | 8.0 | 5.0 | 2.5 | 6.7 | 1.3 |
| 100%-Stored | 0.0 | 0.5 | 0.5 | 0.3 | 0.3 |
| 90:10 | 3.3 | 4.4 | 2.0 | 0.5 | 0.5 |
| 95:5 | 5.0 | 10.0 | 6.0 | 0.5 | 0.5 |
| 97.5:2.5 | 0.5 | 5.0 | 8.0 | 0.5 | 0.5 |
| 97.5:2.5 liq | 20.0 | 33.3 | 10.0 | 0.5 | 0.5 |

[1] All concentrations are presented in ppm

Table 13 presents data for mercaptan concentration from laboratory analysis.

TABLE 13

MERCAPTAN CONCENTRATIONS BY SAMPLE (LABORATORY ANALYSIS)[1]

| Container Tested | Day 2 | Day 3 | Day 4 | Day 7 | Day 8 |
|---|---|---|---|---|---|
| 100%-Fresh | 0.0 | 31.0 | 58.0 | 253.0 | 16.0 |
| 100%-Stored | 0.0 | 0.0 | 3.0 | 0.0 | 0.0 |
| 90:10 | 0.0 | 29.0 | 8.0 | 0.0 | 0.0 |
| 95:5 | 2.0 | 45.0 | 40.0 | 5.0 | 0.0 |
| 97.5:2.5 | 3.0 | 36.0 | 56.0 | 4.0 | 0.0 |
| 97.5:2.5 liq | 4.0 | 68.0 | 83.0 | 5.0 | 0.0 |

[1] All concentrations are in mg/m$^3$

Figure 12:
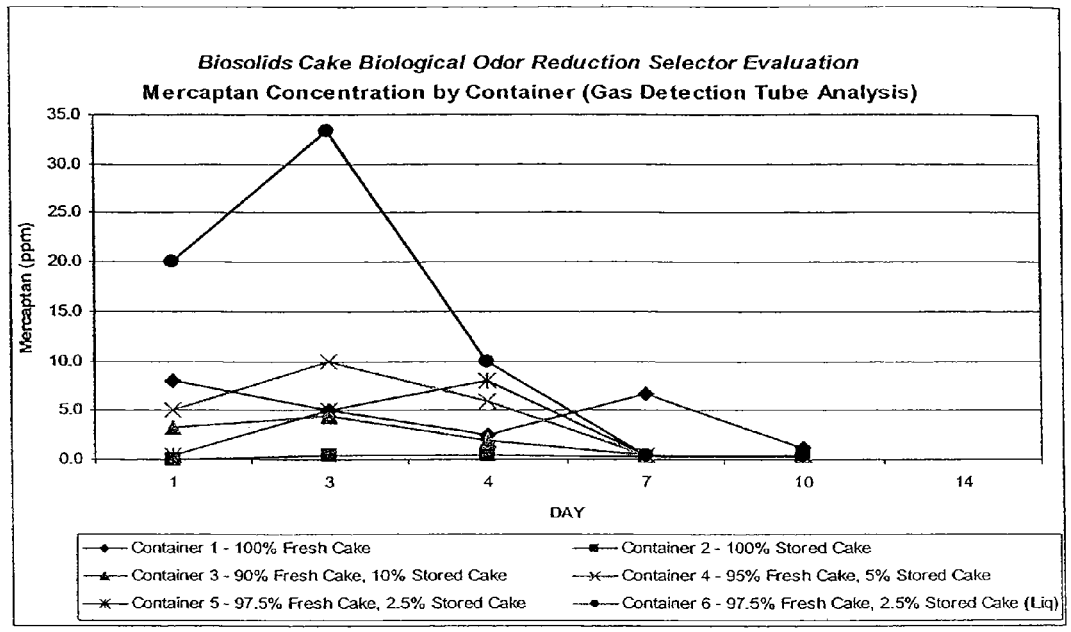
FIG. 12 is a graph of mercaptan concentration by sample container from gas detection tube analysis conducted in Phase II testing.
Figure 13:
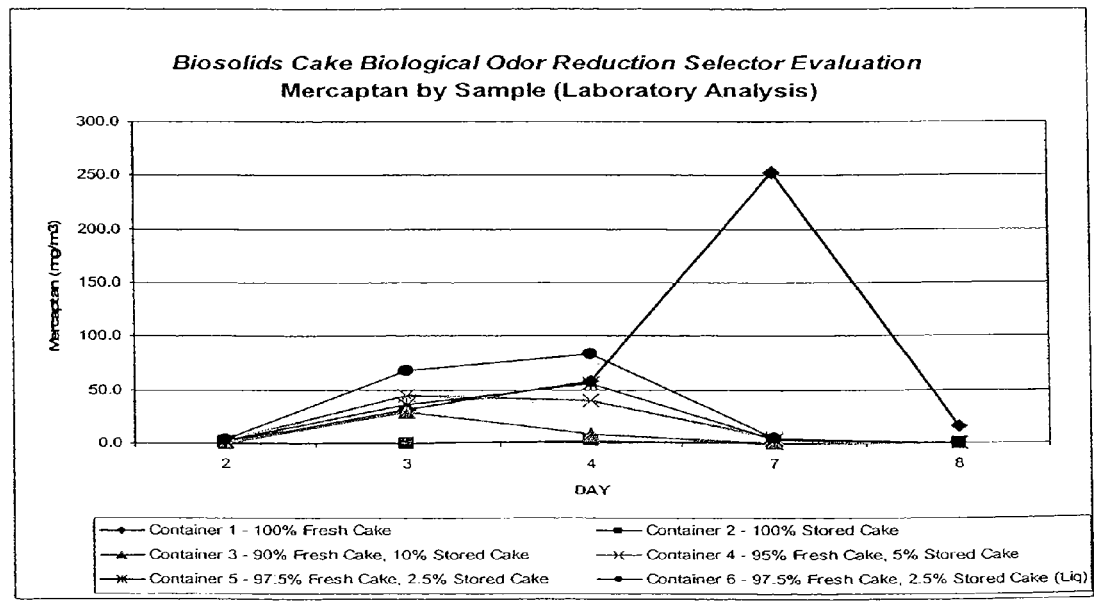
FIG. 13 is a graph of mercaptan concentration by sample container from laboratory analysis conducted in Phase II testing.

FIG. 12 presents the mercaptan results (ppm) from field (gas detection tube) testing by testing day and by sampling container, and FIG. 13 presents the mercaptan concentrations (mg/m$^3$) determined from laboratory analysis.

Table 14 presents the percent reduction data for mercaptan by sample container. Values for percent reduction were obtained from the laboratory results using the same methodology described earlier above for dimethyl sulfide. Negative values indicate a higher overall odorant concentration (over time) than measured in the 100%-Fresh container prior to that testing day.

Figure 14:
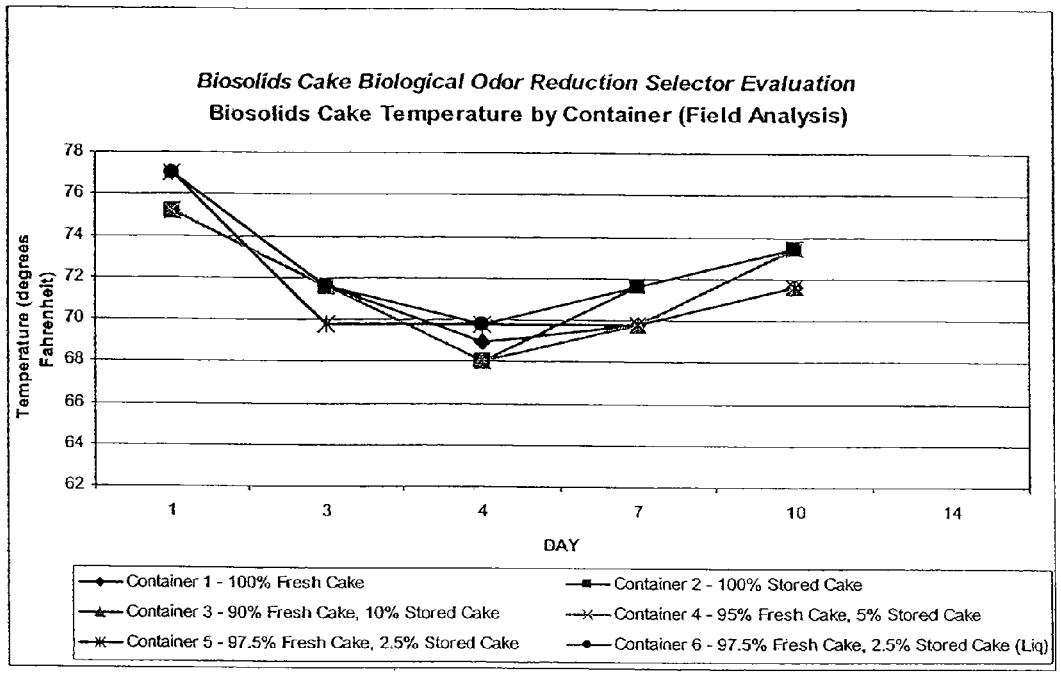
FIG. 14 is a graph of biosolids cake temperature by sample container from field analysis conducted in Phase II testing.

FIG. 14 presents the temperatures in each container over the testing period. As shown in FIG. 14, temperatures remained reasonably consistent in each container and over time among all of the containers.

Figure 15:
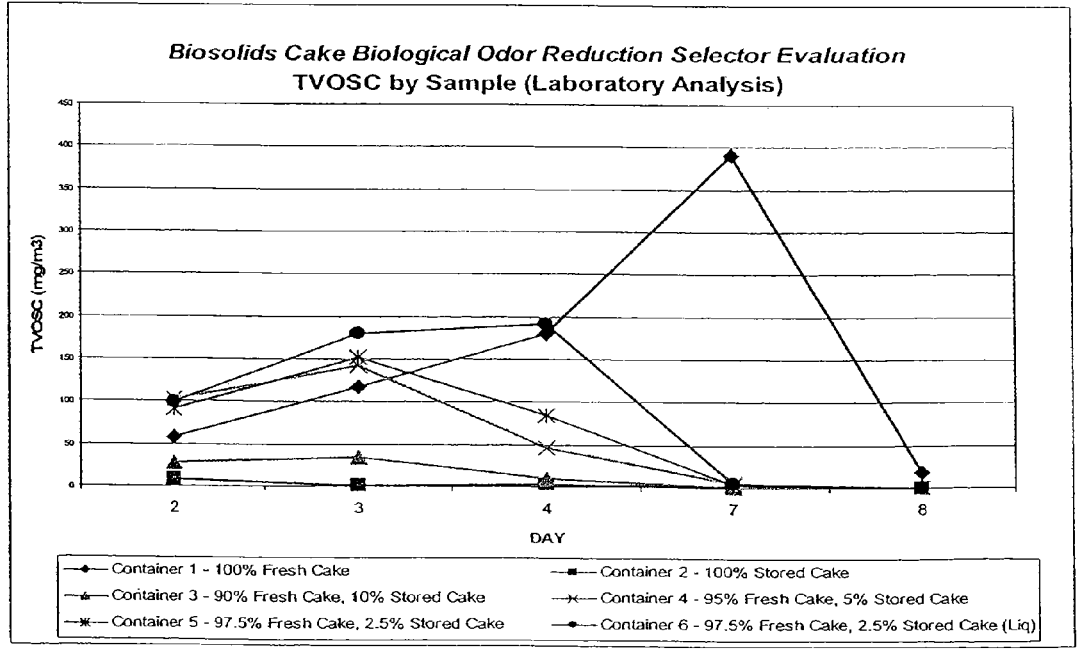
FIG. 15 is a graph of TVOSC by sample from laboratory analysis conducted in Phase II testing.

Table 15 presents the laboratory results for TVOSC by sample, and FIG. 15 illustrates the TVOSC results from laboratory analysis.

TABLE 15

TVOSC BY SAMPLE CONTAINER (LABORATORY ANALYSIS)[1]

| Container Tested | Day 2 | Day 3 | Day 4 | Day 7 | Day 8 |
|---|---|---|---|---|---|
| 100%-Fresh | 58.0 | 117.0 | 180.0 | 391.0 | 18.0 |
| 100%-Stored | 9.0 | 2.0 | 3.0 | 0.0 | 0.0 |
| 90:10 | 28.0 | 34.0 | 10.0 | 0.0 | 0.0 |
| 95:5 | 103.0 | 142.0 | 46.0 | 5.0 | 0.0 |
| 97.5:2.5 | 90.0 | 151.0 | 84.0 | 4.0 | 0.0 |
| 97.5:2.5 liq | 99.0 | 179.0 | 192.0 | 5.0 | 0.0 |

[1] All concentrations are in mg/m$^3$

Table 16 presents the percent reduction data for TVOSC by sample container. The values for percent reduction were obtained from the laboratory results in the same manner as described previously for dimethyl sulfide. Negative values indicate a higher overall odorant concentration (over time) than measured in the 100%-Fresh container prior to that testing day.

TABLE 14

PERCENT REDUCTION FOR MERCAPTAN (LABORATORY ANALYSIS)

| Container ID | Day 3 Cumulative Area (mg/m$^3$ * day) | Day 3 Reduction (%) | Day 4 Cumulative Area (mg/m$^3$ * day) | Day 4 Reduction (%) | Day 7 Cumulative Area (mg/m$^3$ * day) | Day 7 Reduction (%) |
|---|---|---|---|---|---|---|
| 100%-Fresh | 15.5 | — | 60 | — | 526.5 | — |
| 90:10 | 14.5 | 6.5 | 33 | 45.0 | 45 | 91.5 |
| 95:5 | 23.5 | −51.6 | 66 | −10.0 | 133.5 | 74.6 |
| 97.5:2.5 | 19.5 | −25.8 | 65.5 | −9.2 | 155.5 | 70.5 |
| 97.5:2.5liq | 36 | −132.3 | 111.5 | −85.8 | 243.5 | 53.8 |

TABLE 16

PERCENT REDUCTION FOR TVOSC (LABORATORY ANALYSIS)

| Container ID | Day 3 Cumulative Area (mg/m$^3$ * day) | Day 3 Reduction (%) | Day 4 Cumulative Area (mg/m$^3$ * day) | Day 4 Reduction (%) | Day 7 Cumulative Area (mg/m$^3$ * day) | Day 7 Reduction (%) |
|---|---|---|---|---|---|---|
| 100%-Fresh | 87.5 | — | 236 | — | 1092.5 | — |
| 90:10 | 31 | 64.6 | 53 | 77.5 | 68 | 93.8 |
| 95:5 | 122.5 | −40.0 | 216.5 | 8.3 | 293 | 73.2 |
| 97.5:2.5 | 120.5 | −37.7 | 238 | −0.8 | 370 | 66.1 |
| 97.5:2.5liq | 139 | −58.9 | 324.5 | −37.5 | 620 | 43.2 |

Table 17 illustrates the average cumulative percent reduction values for odorant concentrations from laboratory analysis by sample container. The average values in Table 17 were obtained through averaging the Day 8 odorant percent reduction values for each container from Tables 5, 10, and 12. Also shown in Table 17 are the minimum and maximum cumulative percent reduction values associated with each container. As Table 17 shows, all cumulative percent reduction values associated with the 90:10 container were in excess of 90%, which illustrate that the reductions in odorant concentrations were not merely due to a dilution effect. Similar effects can be noted from the data for other sample containers in Table 17.

TABLE 17

PERCENT REDUCTION STATISTICS BY SAMPLE CONTAINER

| Container ID | Average Reduction (%) | Minimum Reduction (%) | Maximum Reduction (%) |
|---|---|---|---|
| Bucket 3b (90% Fresh, 10% Stored) | 93.7 | 91.5 | 95.7 |
| Bucket 4b (95% Fresh, 5% Stored) | 73.0 | 71.2 | 74.6 |
| Bucket 5b (97.5% Fresh, 2.5% Stored) | 67.5 | 66.0 | 70.5 |
| Bucket 6b (97.5% Fresh, 2.5% Stored-Mixed with Liquid) | 42.8 | 31.3 | 53.8 |

DMS levels in the 100%-Fresh container exceeded those in all other containers over most of the study period. Gas detection tube DMS levels in the 90:10 container followed those in the 100%-Stored container closely, particularly on testing Days 7 and 10. DMS levels measured in the 95:5, 97.5:2.5, and 97.5:2.5liq containers were below those measured in the 100%-Fresh container from testing Day 3 onward in field testing, and from testing Day 4 onward in laboratory testing. The laboratory DMS percent reduction value for the 90:10 container reached 77% by testing Day 3, and was greater than 90% by Day 8 of testing. Laboratory DMS percent reduction values for the 95:5, 97.5:2.5, and 97.5:2.5liq containers were all greater than 31% by Day 8 of testing.

Gas detection tube hydrogen sulfide levels measured in the 100%-Fresh container were higher than those in all other containers over most of the duration of testing. However, hydrogen sulfide levels measured with gas detection tubes were highly erratic in all of the containers examined over the testing period, as shown in FIGS. 10 and 11. Additionally, hydrogen sulfide levels measured in the laboratory were also somewhat unpredictable over the duration of testing. Hydrogen sulfide levels in laboratory measurements remained very low throughout testing, with a maximum value of 1.4 milligrams per cubic meter. As in Phase I, sufficient trending was not available from either gas detection tube or laboratory analysis results for conclusions involving hydrogen sulfide behavior. Due to the inconsistent nature of hydrogen sulfide results in Phase II, the values for the percent reduction in hydrogen sulfide were not determined. However, given the small (less than 1.5 mg/m$^3$) values of hydrogen sulfide measured in laboratory testing, the dimethyl sulfide results are more useful in determining actual sulfide removal efficiencies.

Mercaptan levels obtained from gas detection tube analysis in the 90:10 container were substantially below those in the 100%-Fresh container over the duration of testing. Gas detection tube mercaptan levels in the 95:5, 97.5:2.5, and 97.5:2.5liq containers were below those in the 100%-Fresh container from Day 7 on. In laboratory testing for mercaptan, results for the 90:10 container tracked closely with those for the 100%-Stored container from Day 4 through the end of testing. Additionally, laboratory levels of mercaptan in the 90:10 container remained below those in the 100%-Fresh container over the duration of testing. Laboratory mercaptan levels in the 95:5 and 97.5:2.5 containers were below those in the 100%-Fresh container from Day 4 through the end of testing, and laboratory mercaptan levels in the 97.5:2.5liq container were below those in the 100%-Fresh container from Day 7 through the end of testing. Laboratory mercaptan percent reduction in the 90:10 container was 45% by testing Day 4, and greater than 95% by testing Day 8. By testing Day 8, laboratory mercaptan percent reduction values for all containers exceeded 53%.

TVOSC levels in the 90:10 container remained below TVOSC levels in the 100%-Fresh container over the entire duration of testing, with laboratory TVOSC levels in the 90:10 container tracking closely with those in the 100%-Stored container. From testing Day 4 onward, laboratory TVOSC levels in the 95:5 and 97.5:2.5 containers were below those measured in the 100%-Fresh container. A 64% laboratory TVOSC reduction was calculated for the 90:10 container on testing Day 3, and a TVOSC percent reduction greater than 93% was calculated for the 90:10 container on testing Day 8. By testing Day 8, all containers had reduction in TVOSC greater than 40%.

Concentrations of certain headspace odorants examined during Phase II were diminished in containers filled with 2-week old biosolids cake and in containers containing blended biosolids cake. The referenced reductions in concentration were noted when comparing levels in containers holding stored and blended cake with levels in a container holding all fresh biosolids cake. This trend was most evident when comparing headspace odorant concentrations in the 90:10 container with those in the 100%-fresh container. The values reflect that in the 90:10 container, over 91% cumulative reduction was achieved for all headspace odorants evaluated, with the exception of hydrogen sulfide, which was not examined in regard to percent reduction for reasons stated above.

Additionally, greater than 30% reduction was achieved for all headspace odorants examined in all containers with blended biosolids cake. Also, Phase II results were in agreement with Phase I results as to the irregularity of hydrogen sulfide concentrations in all containers examined. However, given the data for percent reduction in dimethyl sulfide concentrations, the potential exists for odor reduction accomplished through blending fresh and stored biosolids cakes.

Phase III Bench Scale Testing

Four, five and seven days before testing Day 0, biosolids cake fresh off a wastewater plant's high solids centrifuge was placed in storage. On testing Day 0, fresh biosolids cake was obtained from the wastewater plant for testing. The parameters from the plant's SCADA system and from field testing were recorded to assess the character of the collected biosolids cakes.

Seven buckets were used. Each bucket was filled with a known quantity of biosolids cake on testing Day 0. Each bucket was fitted with a sealed cover having an orifice with a thermometer and a Drager tube. The orifice in each bucket was plugged with duct tape between testing events to simulate bottle sampling done in WERF odor studies.

Biosolids cake was added to the buckets on testing Day 0 as follows. Bucket 1 was loaded with 100% fresh biosolids cake. Bucket 2 was loaded with 90% fresh biosolids cake and 10% four day old biosolids cake. Bucket 3 was loaded with 90% fresh biosolids cake and 10% five day old biosolids cake. Buckets 4a and 4b were each loaded with 90% fresh biosolids cake and 10% seven day old biosolids cake. Bucket 5 was loaded with 90% fresh biosolids cake and 10% four day old biosolids cake. Additionally, on testing Day 4, 90% of the now four day olds biosolids in bucket 5 was removed and 90% fresh biosolids cake was mixed with the remaining 10% of the four day old bisolids cake. Bucket 6 was loaded with 100% fresh biosolids cake.

The buckets with mixed cake were blended by plunging and rotating a clawed soil blending tool into the cake mixture repeatedly until the mixture appeared to be uniform. The mixing tool was cleaned before mixing the contents of each successive container to avoid any cross-contamination among the different containers. The buckets were labeled and stored in a secure place with exposure to ambient temperatures.

On testing Days 1, 3, 4, 5, 7, and 10, Drager tubes were used to measure concentrations in ppmv of headspace odorants in buckets 1 through 4B, including DMS and mercaptan. On testing Days 1, 4, 7 and 10, hydrogen sulfide levels were measure in buckets 1 through 4B. On testing Days 5, 6, 7, 8, 9, 11 and 14, DMS and mercaptan levels were measured in buckets 5 and 6. On testing Days 5, 8, 11 and 14, hydrogen sulfide levels were measured in buckets 5 and 6. Additionally, temperatures of the biosolids cake were measured immediately after each instance of odor testing. In all tables and graphs including test results for buckets 5 and 6, testing Day 4 is presented as Day 0 with subsequent days identified accordingly (i.e., "Day 0" in a graph or table for bucket 5 or 6 represents testing Day 4, "Day 1" represents testing Day 5, and so on).

Table 18 presents parameters for the collected biosolids cake. The parameters were obtained from the wastewater plant's SCADA system and from field testing representative portions of the collected biosolids.

TABLE 18

DIMETHYL SULFIDE CONCENTRATIONS BY SAMPLE CONTAINER

| Date | Digested Sludge Feed Rate (gpm) | Digested Sludge Conc. (% TS) | Dewatered Cake Conc. (% TS) | Ferric Chloride Addition (mg/L) | Polymer Addition (gpm) | Initial Cake Temperature (° F.) | Initial Cake pH |
|---|---|---|---|---|---|---|---|
| 7 Days Prior to Testing Day 0 | 400 | 2.82 | 26.80 | 1.2 | 40 | 104 | Unavailable |
| 5 Days Prior to Testing Day 0 | 400 | 2.65 | 23.68 | 1.2 | 40 | 104 | 7.20 |
| 4 Days Prior to Testing Day 0 | 400 | 3.00 | 22.35 | 1.2 | 40 | 100 | 7.36 |
| Testing Day 0 | 350 | 2.84 | 24.06 | 1.2 | 40 | 106 | 7.51 |
| Testing Day 4 | 270 | 3.18 | 23.76 | 1.2 | 29 | Unavailable | Unavailable |

Figure 16:
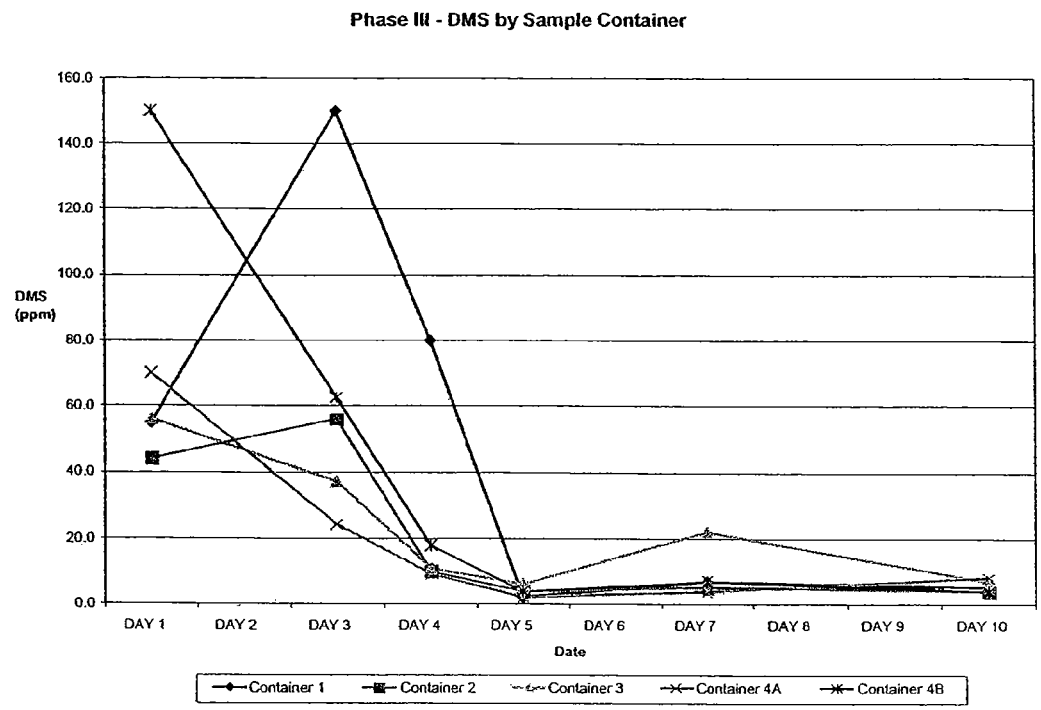
FIG. 16 is a graph of DMS concentration by sample container from field analysis conducted in Phase III testing.
Figure 17:
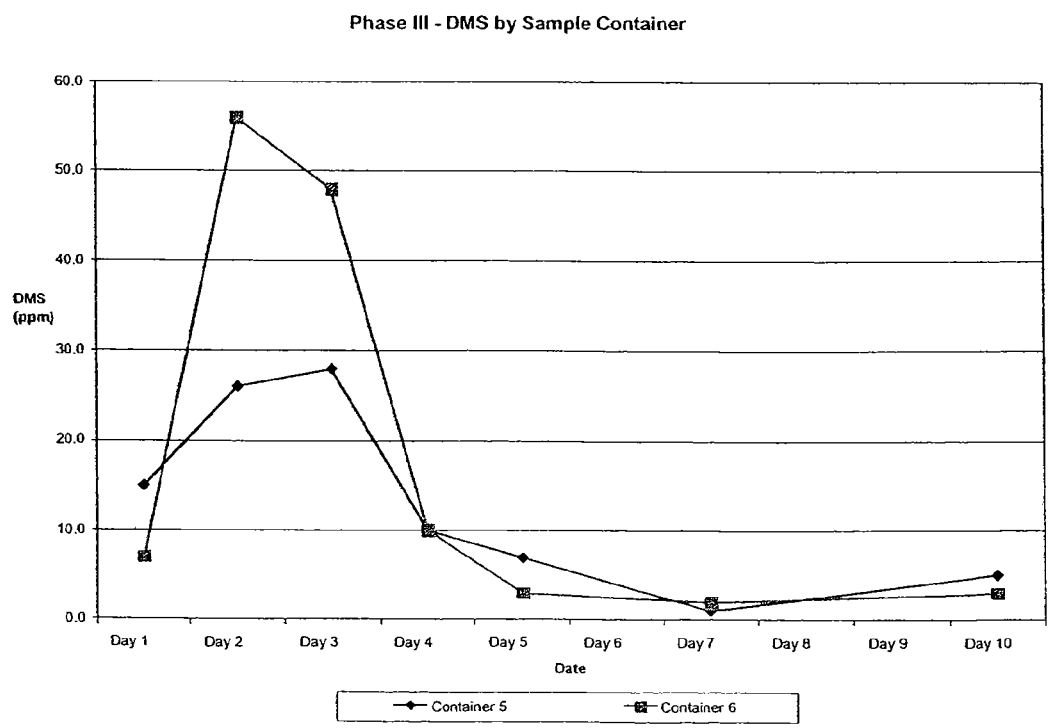
FIG. 17 is another graph of DMS concentration by sample container from field analysis conducted in Phase III testing.

The DMS concentrations measured using the Drager tube are presented for each testing day in Tables 19 and 20. Table 19 contains the raw data from DMS testing for buckets 1 through 4B, and Table 20 contains the raw data from DMS testing for buckets 5 and 6. FIGS. 16 and 17 depict graphical representations of the data from Tables 19 and 20, respectively.

TABLE 19

DMS CONCENTRATIONS BY SAMPLE CONTAINER (BUCKETS 1-4B)

| Bucket | Day 1 | Day 3 | Day 4 | Day 5 | Day 7 | Day 10 |
|---|---|---|---|---|---|---|
| 1 | 55.0 | 150 | 80.0 | 2.0 | 7.0 | 5.0 |
| 2 | 44.0 | 56.0 | 10.0 | 4.0 | 5.0 | 4.0 |
| 1 | 55.0 | 150 | 80.0 | 2.0 | 7.0 | 5.0 |
| 2 | 44.0 | 56.0 | 10.0 | 4.0 | 5.0 | 4.0 |
| 3 | 56.0 | 37.1 | 11.0 | 6.0 | 22.0 | 7.0 |
| 4A | 70.0 | 24.0 | 9.0 | 2.0 | 4.0 | 8.0 |
| 4B | 150 | 62.5 | 17.9 | 4.0 | 7.0 | 4.0 |

TABLE 20

DMS CONCENTRATIONS BY SAMPLE CONTAINER (BUCKETS 5 &6)

| Bucket | Day 1 | Day 2 | Day 3 | Day 4 | Day 5 | Day 7 | Day 10 |
|---|---|---|---|---|---|---|---|
| 5 | 15.0 | 26.0 | 28.0 | 10.0 | 7.0 | 1.0 | 5.0 |
| 6 | 7.0 | 56.0 | 48.0 | 10.0 | 3.0 | 2.0 | 3.0 |

Tables 21 and 22 show the calculated percent reduction values for DMS. The values for DMS percent reduction were obtained in a manner similar to the one described for the other phases. Values with negative numbers indicate a higher overall odorant concentration over time than measured in the 100% fresh container prior to the particular testing day. Table 21 presents the calculated percent reduction values for buckets 1 through 4B with bucket 1 used as the baseline for determining percent reduction for DMS in buckets 2 through 4B. Table 22 presents the calculated percent reduction values for buckets 5 and 6 with bucket 6 used as the baseline for determining percent reduction values for DMS in bucket 5.

TABLE 21

DMS PERCENT REDUCTION VALUES (BUCKET 1-4B)

| Bucket | Day 3 Reduction (%) | Day 4 Reduction (%) | Day 5 Reduction (%) | Day 7 Reduction (%) | Day 10 Reduction (%) |
|---|---|---|---|---|---|
| 1 | — | — | — | — | — |
| 2 | 51.2 | 58.4 | 61.2 | 59.7 | 58.1 |
| 3 | 54.6 | 63.4 | 65.2 | 58.5 | 49.2 |
| 4A | 54.1 | 65.5 | 67.9 | 67.0 | 63.9 |
| 4B | -3.7 | 21.0 | 27.0 | 25.8 | 25.0 |

TABLE 22

DMS PERCENT REDUCTION VALUES (BUCKETS 5 &6)

| Bucket | Day 2 Reduction (%) | Day 3 Reduction (%) | Day 4 Reduction (%) | Day 5 Reduction (%) | Day 7 Reduction (%) | Day 10 Reduction (%) |
|---|---|---|---|---|---|---|
| 5 | 34.9 | 43.1 | 40.9 | 37.0 | 33.1 | 30.0 |
| 6 | — | — | — | — | — | — |

Figure 18:
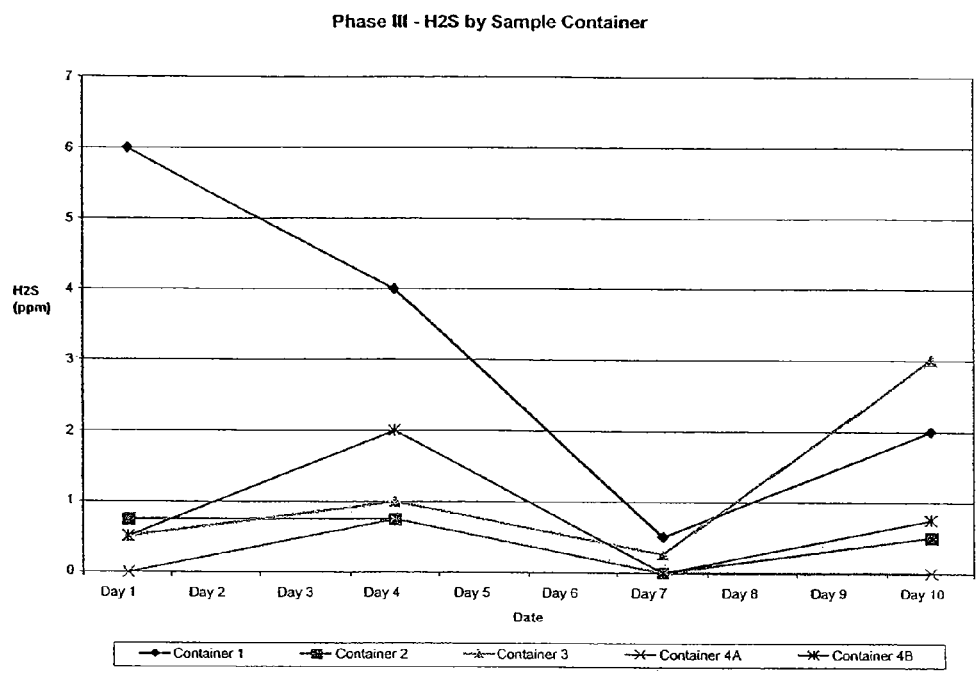
FIG. 18 is a graph of hydrogen sulfide concentration by sample container from field analysis conducted in Phase III testing.
Figure 19:
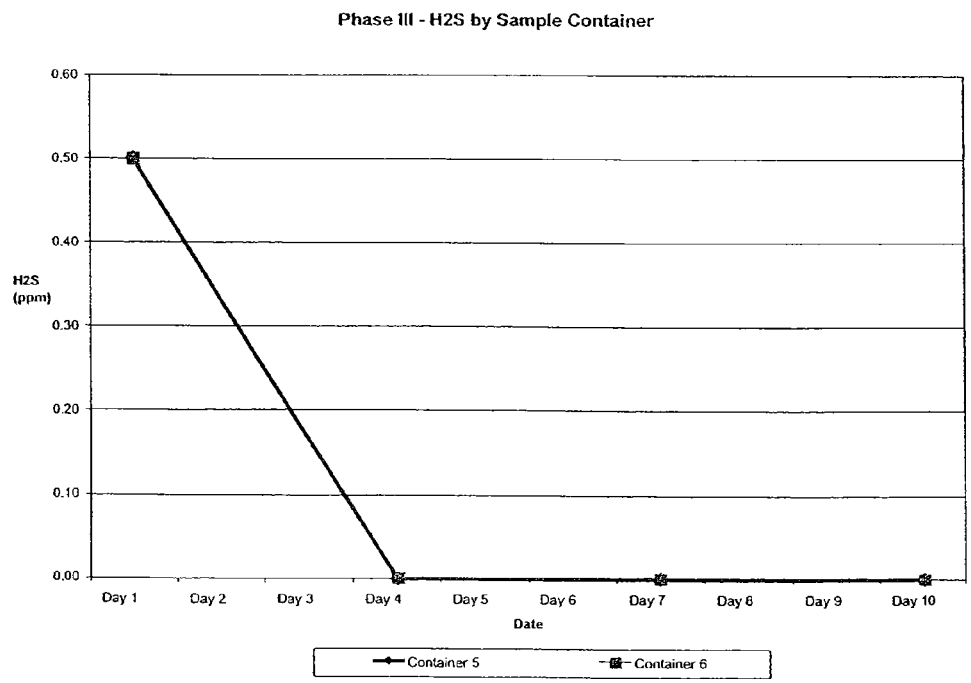
FIG. 19 is another graph of hydrogen sulfide concentration by sample container from field analysis conducted in Phase III testing.

The Drager tube results for hydrogen sulfide testing are presented for by sample bucket in Tables 23 and 24. Table 23 contains the raw data from hydrogen sulfide testing for buckets 1 through 4B, and Table 24 contains the raw data from hydrogen sulfide testing for buckets 5 and 6. FIGS. 18 and 19 depict graphical representations of the data from Tables 23 and 24, respectively. Entries in the table with "ND" indicate non-detection of hydrogen sulfide (i.e., hydrogen sulfide levels were below the detection limit of 0.2 ppmv).

TABLE 23

$H_2S$ CONCENTRATIONS BY SAMPLE CONTAINER (BUCKETS 1-4B)

| Bucket | Day 1 | Day 4 | Day 7 | Day 10 |
|---|---|---|---|---|
| 1 | 6.0 | 4.0 | 0.5 | 2.0 |
| 2 | 0.8 | 0.8 | ND | 0.5 |
| 3 | 0.5 | 1.0 | 0.3 | 3.0 |
| 1 | 6.0 | 4.0 | 0.5 | 2.0 |
| 2 | 0.8 | 0.8 | ND | 0.5 |
| 4A | ND | 0.8 | ND | ND |
| 4B | 0.5 | 2.0 | ND | 0.8 |

TABLE 24

$H_2S$ CONCENTRATIONS BY SAMPLE CONTAINER (BUCKETS 5 &6)

| Bucket | Day 1 | Day 4 | Day 7 | Day 10 |
|---|---|---|---|---|
| 5 | 0.5 | ND | ND | ND |
| 6 | 0.5 | ND | ND | ND |

Tables 25 and 26 show the calculated percent reduction values for hydrogen sulfide. The calculated values were obtained in a manner similar to the one described for the other phases. Table 25 presents the calculated hydrogen sulfide values for buckets 1 through 4B with bucket 1 used as the baseline for determining the percent reduction in buckets 2 through 4B. Table 26 presents the calculated percent hydrogen sulfide reduction values for buckets 5 and 6 with bucket 6 used as the baseline for determining percent reduction values in bucket 5.

TABLE 25

$H_2S$ PERCENT REDUCTION VALUES (BUCKETS 1-4B)

| Bucket | Day 4 Reduction (%) | Day 7 Reduction (%) | Day 10 Reduction (%) |
|---|---|---|---|
| 1 | — | — | — |
| 2 | 85.0 | 84.5 | 83.8 |
| 3 | 85.0 | 81.0 | 64.7 |
| 4A | 92.5 | 89.7 | 91.2 |
| 4B | 75.0 | 69.0 | 69.1 |

TABLE 26

$H_2S$ PERCENT REDUCTION VALUES (BUCKETS 5 &6)

| Bucket | Day 4 Reduction (%) | Day 7 Reduction (%) | Day 10 Reduction (%) |
|---|---|---|---|
| 5 | 0.0 | 0.0 | 0.0 |
| 6 | — | — | — |

Figure 20:
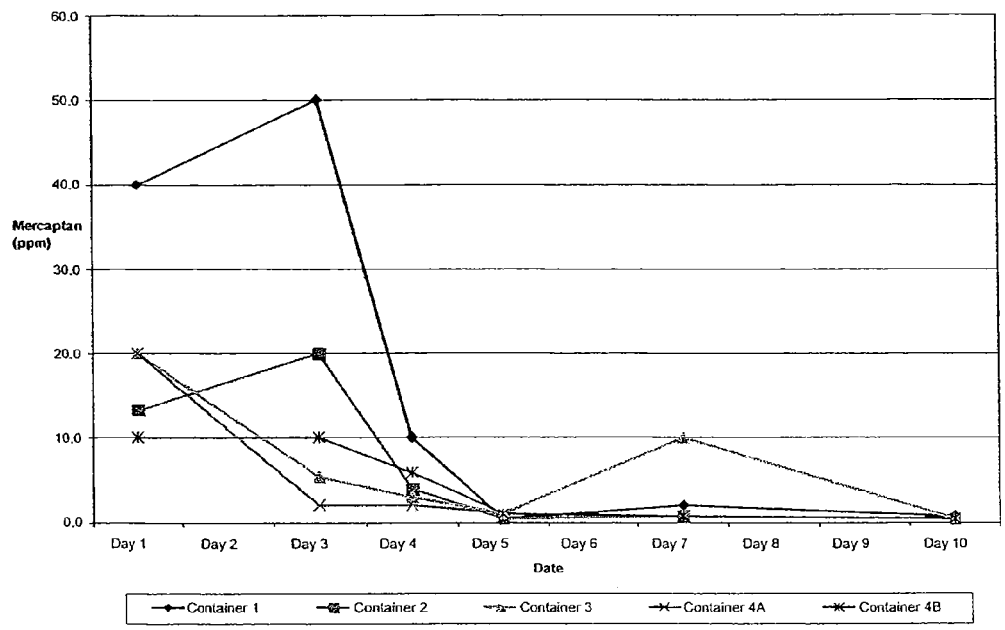
FIG. 20 is a graph of mercaptan concentration by sample container from field analysis conducted in Phase III testing.
Figure 21:
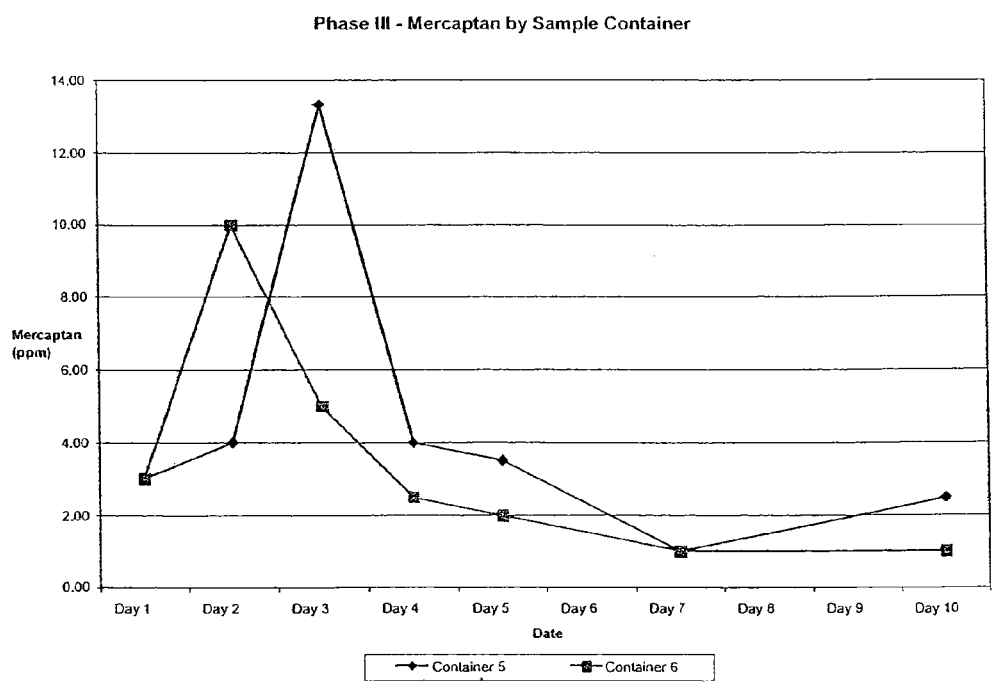
FIG. 21 is another graph of mercaptan concentration by sample container from field analysis conducted in Phase III testing.

The Drager tube results for mercaptan testing are presented for each testing day by sample bucket in Tables 27 and 28. Table 27 contains the raw data from mercaptan testing for buckets 1 through 4B, and Table 28 contains the raw data from mercaptan testing for buckets 5 and 6. FIGS. 20 and 21 depict graphical representations of the data from Tables 25 and 26.

TABLE 27

MERCAPTAN BY SAMPLE CONTAINER (BUCKETS 1-4B)

| Bucket | Day 1 | Day 3 | Day 4 | Day 5 | Day 7 | Day 10 |
|---|---|---|---|---|---|---|
| 1 | 40.0 | 50.0 | 10.0 | 0.5 | 2.0 | 0.8 |
| 2 | 13.3 | 20.0 | 4.0 | 0.5 | 0.8 | 0.5 |

TABLE 27-continued

MERCAPTAN BY SAMPLE CONTAINER (BUCKETS 1-4B)

| Bucket | Day 1 | Day 3 | Day 4 | Day 5 | Day 7 | Day 10 |
|---|---|---|---|---|---|---|
| 3 | 20.0 | 5.3 | 3.0 | 1.0 | 10.0 | 0.5 |
| 4A | 20.0 | 2.0 | 2.0 | 1.0 | 0.8 | 0.5 |
| 4B | 10.0 | 10.0 | 5.8 | 1.0 | 0.8 | 0.5 |

TABLE 28

MERCAPTAN BY SAMPLE CONTAINER (BUCKETS 5 &6)

| Bucket | Day 1 | Day 2 | Day 3 | Day 4 | Day 5 | Day 7 | Day 10 |
|---|---|---|---|---|---|---|---|
| 5 | 3.0 | 4.0 | 13.3 | 4.0 | 3.5 | 1.0 | 2.5 |
| 6 | 3.0 | 10.0 | 5.0 | 2.5 | 2.0 | 1.0 | 1.0 |

Tables 29 and 30 show the calculated percent reduction values for mercaptan. The values for mercaptan percent reduction were obtained in the manner similar to the one described for the other phases. Values with negative numbers indicate a higher overall odorant concentration over time than measured in the 100% fresh container prior to the particular testing day. Table 29 presents the calculated percent mercaptan reduction values for buckets 1 through 4B with bucket 1 used as the baseline for determining the percent reduction in buckets 2 through 4B. Table 30 presents the calculated percent mercaptan reduction values for buckets 5 and 6 with bucket 6 used as the baseline for determining percent reduction values in bucket 5.

TABLE 29

MERCAPTAN PERCENT REDUCTION VALUES (BUCKETS 1-4B)

| Bucket | Day 3 Reduction (%) | Day 4 Reduction (%) | Day 5 Reduction (%) | Day 7 Reduction (%) | Day 10 Reduction (%) |
|---|---|---|---|---|---|
| 1 | — | — | — | — | — |
| 2 | 63.0 | 62.2 | 62.0 | 61.8 | 61.5 |
| 3 | 71.9 | 75.4 | 74.9 | 66.7 | 55.8 |
| 4A | 75.6 | 80.0 | 79.6 | 78.7 | 77.9 |
| 4B | 77.8 | 76.7 | 75.0 | 74.1 | 73.5 |

TABLE 30

MERCAPTAN PERCENT REDUCTION VALUES (BUCKETS 5 &6)

| Bucket | Day 2 Reduction (%) | Day 3 Reduction (%) | Day 4 Reduction (%) | Day 5 Reduction (%) | Day 7 Reduction (%) | Day 10 Reduction (%) |
|---|---|---|---|---|---|---|
| 5 | 46.2 | 13.1 | −17.4 | −22.9 | −26.4 | −32.1 |
| 6 | — | — | — | — | — | — |

Tables 31 and 32 present the measured cake temperature by sample bucket. Table 31 contains the measured cake temperature for bucket 1 through 4B, and Table 32 contains the measured cake temperature for buckets 5 and 6. Prior to testing Day 5, it was assumed that cake temperatures were relatively consistent in each bucket, thus no temperature measurements of the cake in individual buckets were taken. Accordingly, prior to testing Day 5, the temperature measured in bucket 1 is used for the temperature values in Table 31.

TABLE 31

CAKE TEMPERATURES (BUCKETS 1-4B)

| Bucket | Day 1 | Day 3 | Day 4 | Day 5 | Day 7 | Day 10 |
|---|---|---|---|---|---|---|
| 1 | 93.2 | 102.2 | 100.4 | 91.4 | 96.8 | 97.7 |
| 2 | 93.2 | 102.2 | 100.4 | 95.9 | 96.8 | 93.2 |
| 3 | 93.2 | 102.2 | 100.4 | 98.6 | 104.9 | 93.2 |
| 4A | 93.2 | 102.2 | 100.4 | 95.0 | 97.7 | 101.3 |
| 4B | 93.2 | 102.2 | 100.4 | 95.0 | 102.2 | 98.6 |

TABLE 32

CAKE TEMPERATURES (BUCKETS 5 &6)

| Bucket | Day 1 | Day 2 | Day 3 | Day 4 | Day 5 | Day 7 | Day 10 |
|---|---|---|---|---|---|---|---|
| 5 | 102.2 | 102.2 | 106.7 | 100.94 | 100.76 | 92.66 | 101.84 |
| 6 | 98.6 | 102.2 | 101.3 | 99.5 | 96.8 | 89.78 | 98.78 |

Figure 22:
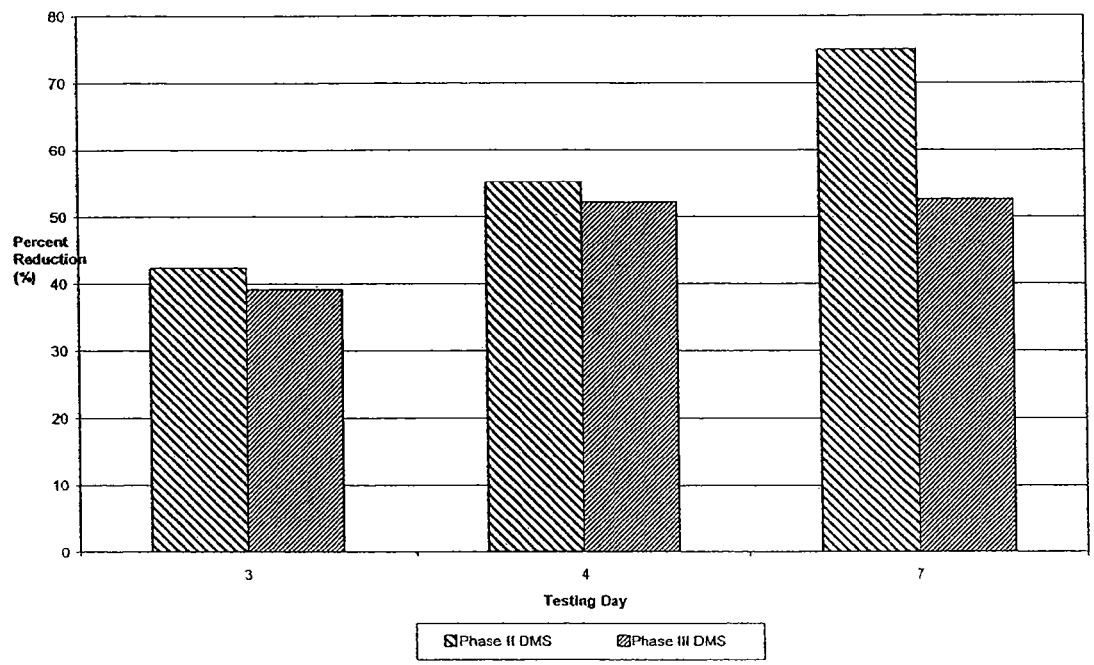
FIG. 22 is a graph comparing percent reduction in DMS concentration between Phase II and Phase III testing.
Figure 23:
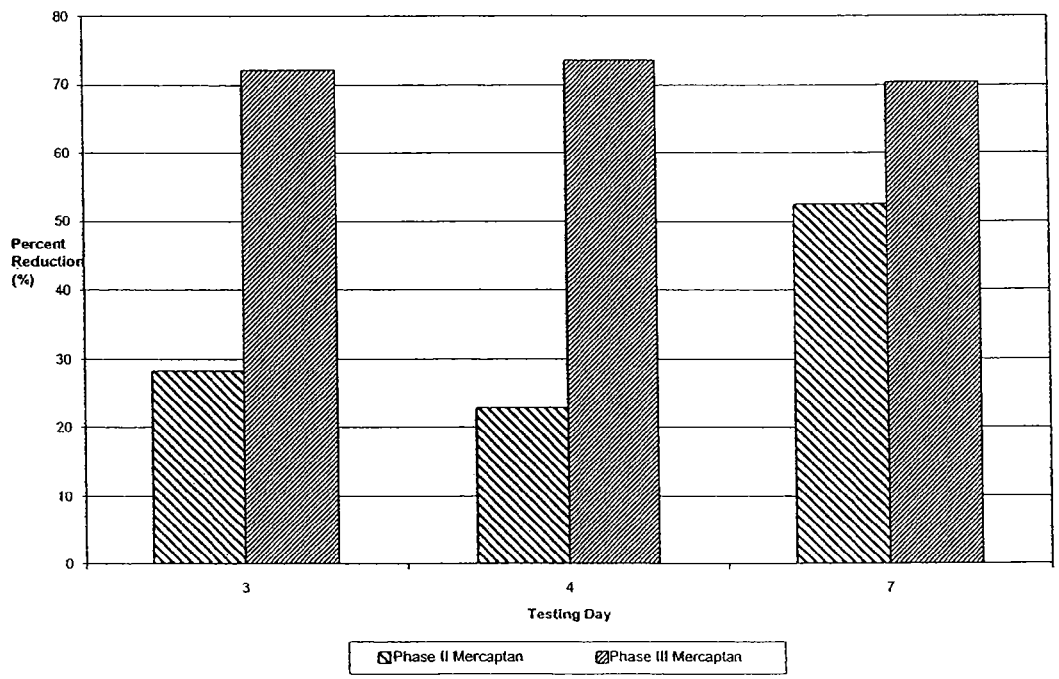
FIG. 23 is a graph comparing percent reduction in DMS concentration between Phase II and Phase III testing.

Table 33 presents a comparison of the values for DMS and mercaptan percent reduction for Phases II and III. The DMS and mercaptan percent reduction values for Phase III are averages of the values obtained from buckets 1 through 4B on each testing day. FIG. 22 presents the DMS data from Table 33 in graphical form, and FIG. 23 presents the mercaptan data from Table 33 in graphical form.

TABLE 33

PERCENT REDUCTION (PHASE II &PHASE III)

| | Day 3 | | Day 4 | | Day 7 | |
|---|---|---|---|---|---|---|
| Odorant | Phase II | Phase III | Phase II | Phase III | Phase II | Phase IIII |
| DMS | 42.3 | 39.1 | 55.2 | 52.1 | 74.9 | 52.7 |
| Mercaptan | 28.3 | 72 | 22.9 | 73.6 | 52.5 | 70.3 |

While the percent reduction values varied between Phases II and III, the stored cake added to the fresh cake in Phase III was stored a significantly shorter amount of time than the stored cakes added to the fresh cake in Phase II. Additionally, the temperatures varied significantly between Phase II and Phase III.

Figure 24:
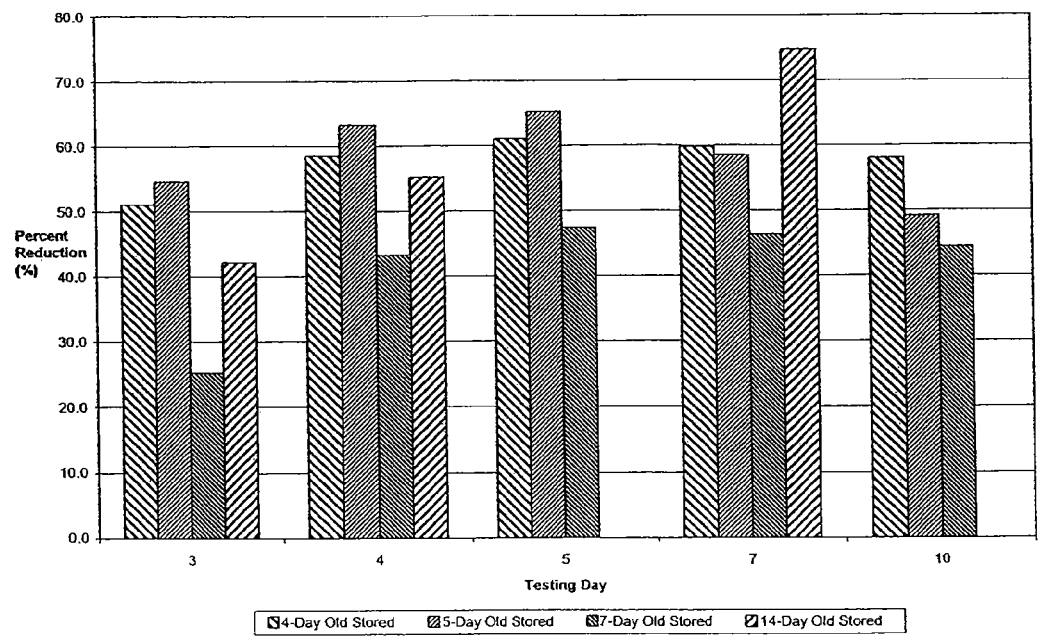
FIG. 24 is a graph showing by various testing days the percent reduction in DMS concentration by age of the stored cake.
Figure 25:
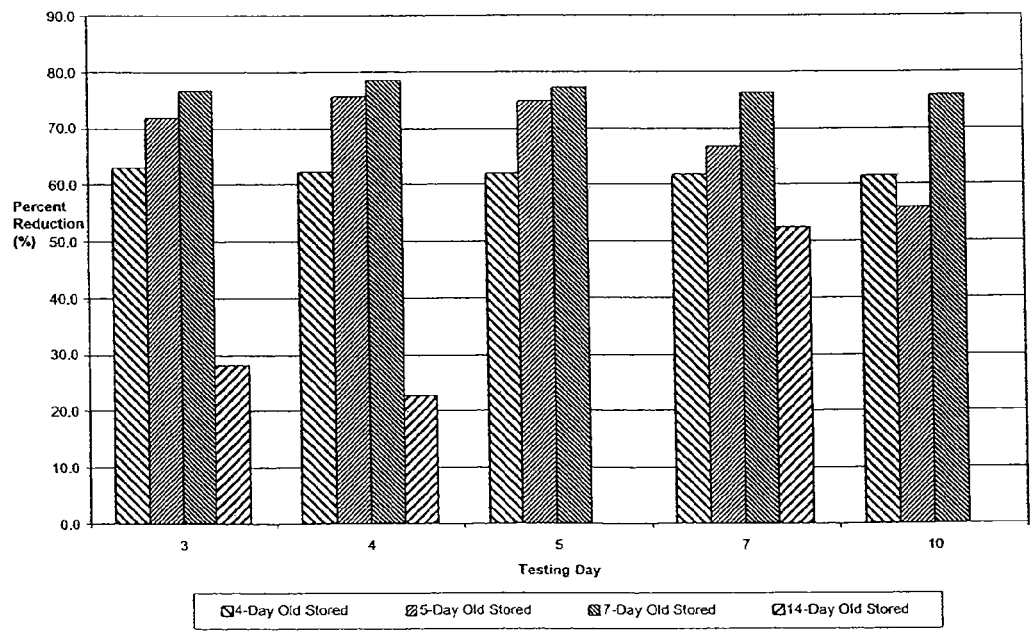
FIG. 25 is a graph showing by various testing days the percent reduction in mercaptan concentration by age of the stored cake.
Figure 26:
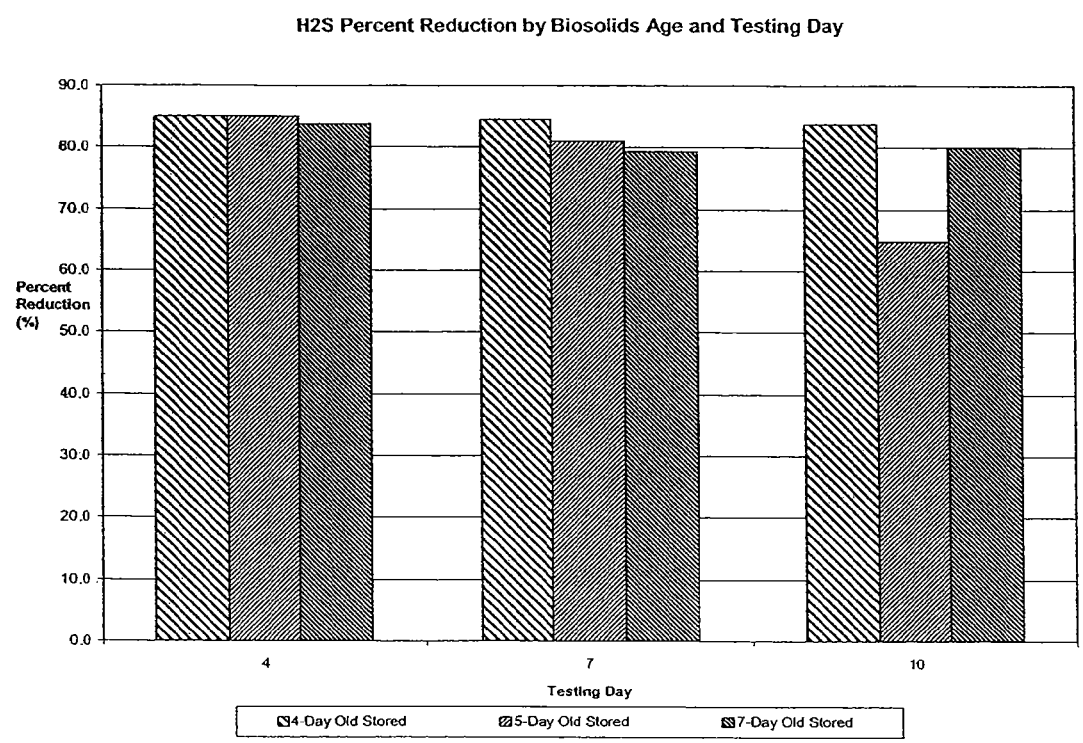
FIG. 26 is a graph showing by various testing days the percent reduction in hydrogen sulfide concentration by age of the stored cake.

For Phase III, FIGS. 24, 25, and 26 depict the percent reduction values by testing day for DMS, mercaptan, and hydrogen sulfide, respectively. The results are presented by age of the stored cake portion. Since two buckets were used for the seven day old stored cake in Phase III, the average percent reduction of these buckets is used in FIGS. 24, 25 and 26. For purposes of comparison, the figures include the Phase II testing results for the equivalent mixture percent of stored to fresh cakes of the fourteen day old stored cake blend. Because of the inconsistent results for hydrogen sulfide in Phase II, no Phase II hydrogen sulfide data is used in FIG. 26.

In methodologies directly or indirectly set forth herein, various steps and operations are described in one possible order of operation, but those skilled in the art will recognize that steps and operations may be rearranged, replaced, or eliminated or have other steps inserted without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A method for reducing odors emitted by anaerobically digested dewatered biosolids, comprising:
   dewatering anaerobically digested biosolids to form first anaerobically digested dewatered biosolids;
   mixing the first anaerobically digested dewatered biosolids with second anaerobically digested dewatered biosolids, the second anaerobically digested dewatered biosolids comprising anaerobically digested dewatered biosolids stored at least approximately three days after dewatering.

2. The method of claim 1, wherein the second anaerobically digested dewatered biosolids further comprise anaerobically digested dewatered biosolids stored between approximately three to thirty days after dewatering.

3. The method of claim 1, wherein the second anaerobically digested dewatered biosolids further comprise anaerobically digested dewatered biosolids stored between approximately four to fourteen days after dewatering.

4. The method of claim 1, further comprising adding water to the second anaerobically digested dewatered biosolids to form a slurry.

5. The method of claim 1, wherein the stored anaerobically digested dewatered biosolids are stored in a first area comprising at least one of a silo, a hopper, and a covered storage pile.

6. The method of claim 1, wherein the stored anaerobically digested dewatered biosolids are stored at a temperature between approximately 10 and 40 degrees Celsius.

7. A method for reducing odors emitted by anaerobically digested dewatered biosolids, comprising:
   separating first anaerobically digested dewatered biosolids into a first portion and a second portion with the second portion comprising no greater than approximately ten percent of the first anaerobically digested dewatered biosolids;
   storing second anaerobically digested dewatered biosolids in a first area;
   removing a portion of the second anaerobically digested dewatered biosolids, the removed portion comprising anaerobically digested dewatered biosolids stored for at least a select period of time in the first area after dewatering the removed portion; and
   mixing the removed portion of the second anaerobically digested dewatered biosolids with the first portion of the first anaerobically digested dewatered biosolids.

8. The method of claim 7, further comprising adding the second portion of the first anaerobically digested dewatered biosolids to the second anaerobically digested dewatered biosolids.

9. The method of claim 7, wherein the second anaerobically digested dewatered biosolids are stored at a temperature of between approximately 10 degrees Celsius and 40 degrees Celsius.

10. The method of claim 7, wherein the select period of time is between approximately four to fourteen days.

11. The method of claim 7, wherein a substantial portion of the removed portion of the second anaerobically digested dewatered biosolids is stored for the at least the select period of time.

12. The method of claim 7, wherein the select period of time is approximately an amount of time for methanogens contained within the second anaerobically digested biosolids to achieve a desired level of biological activity after dewatering the second anaerobically digested biosolids.

13. The method of claim 7, further comprising dewatering the first anaerobically dewatered digested biosolids prior to separating the first anaerobically digested dewatered biosolids into first and second portions.

14. The method of claim 7, further comprising storing the mixed first portion of the first anaerobically digested dewatered biosolids and removed portion of the second anaerobically digested dewatered biosolids in a second area.

15. The method of claim 14, further comprising transporting the mixed first portion of the first anaerobically digested biosolids and removed portion of the second anaerobically digested biosolids from the second area to a third area.

16. The method of claim 15, wherein the mixed first portion of the first anaerobically digested biosolids and removed portion of the second anaerobically digested biosolids are stored in the second area for at least no greater than approximately seven days prior to transport to the third area.

17. The method of claim 15, wherein the third area comprises a land application area.

18. The method of claim 7, wherein a ratio by weight of the removed portion of the second anaerobically digested biosolids to the first portion of the first anaerobically digested biosolids is between approximately 1:99 and 1:9.

19. The method of claim 7, wherein a ratio by weight of the first portion of the first anaerobically digested biosolids to the second portion of the first anaerobically digested biosolids is no greater than approximately 9:1.

* * * * *